(12) United States Patent
Post et al.

(10) Patent No.: US 6,895,729 B2
(45) Date of Patent: May 24, 2005

(54) METHOD AND APPARATUS FOR MANUFACTURING A BAG HAVING AN INDENT BOTTOM WALL

(75) Inventors: William E. Post, Canton, OH (US); Larry L. Lanham, Canton, OH (US)

(73) Assignee: Polymer Packaging, Inc., North Canton, OH (US)

( * ) Notice: Subject to any disclaimer, the term of this patent is extended or adjusted under 35 U.S.C. 154(b) by 11 days.

(21) Appl. No.: 10/394,638

(22) Filed: Mar. 21, 2003

(65) Prior Publication Data

US 2004/0142805 A9 Jul. 22, 2004

Related U.S. Application Data

(63) Continuation-in-part of application No. 10/246,146, filed on Sep. 18, 2002, now abandoned.
(60) Provisional application No. 60/323,611, filed on Sep. 19, 2001.

(51) Int. Cl.[7] .................................................. B65B 9/00
(52) U.S. Cl. .............................. 53/451; 53/552; 53/450; 53/456; 53/551; 53/370.6
(58) Field of Search .......................... 53/552, 551, 450, 53/451, 456, 482, 370.6

(56) References Cited

U.S. PATENT DOCUMENTS

| | | | | |
|---|---|---|---|---|
| 3,543,477 A | * | 12/1970 | Leasure ........................ | 53/551 |
| 5,102,384 A | * | 4/1992 | Ross et al. ................... | 493/243 |
| 5,452,844 A | * | 9/1995 | Bochet et al. ............... | 229/104 |
| 6,042,526 A | * | 3/2000 | Baumer ....................... | 493/218 |
| 6,485,177 B2 | * | 11/2002 | Bell ............................ | 383/210 |
| 6,510,673 B1 | * | 1/2003 | Visona' et al. ................ | 53/451 |
| 6,679,034 B2 | * | 1/2004 | Kohl et al. ................... | 53/551 |
| 2003/0051442 A1 | * | 3/2003 | Post et al. | |
| 2003/0054929 A1 | * | 3/2003 | Post et al. | |

* cited by examiner

Primary Examiner—Scott A. Smith
Assistant Examiner—Brian Nash
(74) Attorney, Agent, or Firm—Zollinger & Burleson, Ltd.

(57) ABSTRACT

A method and apparatus for forming a bag provides a tube of material that is passed over a former. A portion of the tube is folded over the former to define the rim of the bag. Portions of the rim are then welded. The apparatus includes arms that move transverse to the tube. The arms carry crimping fingers that pivot to fold the tube up and in over the former.

18 Claims, 42 Drawing Sheets

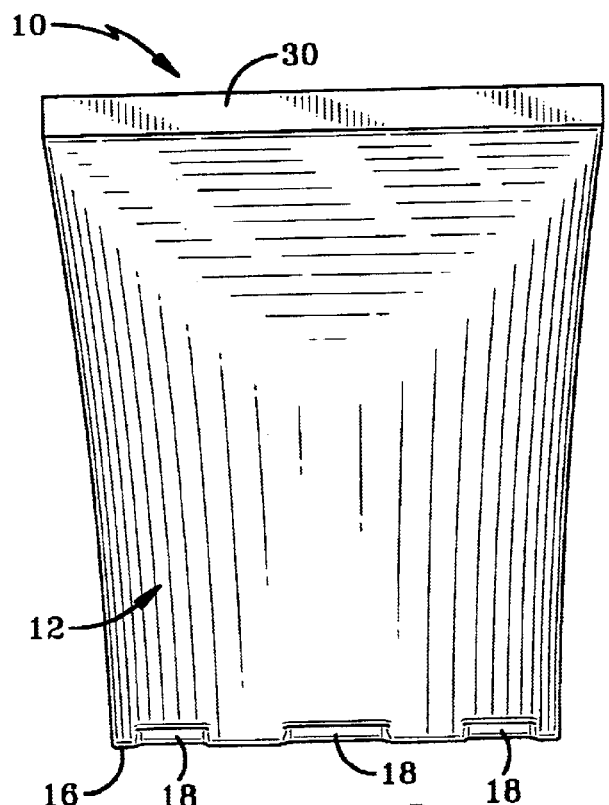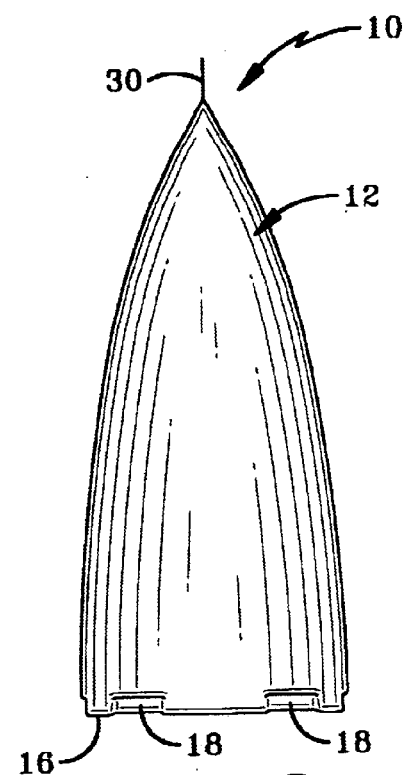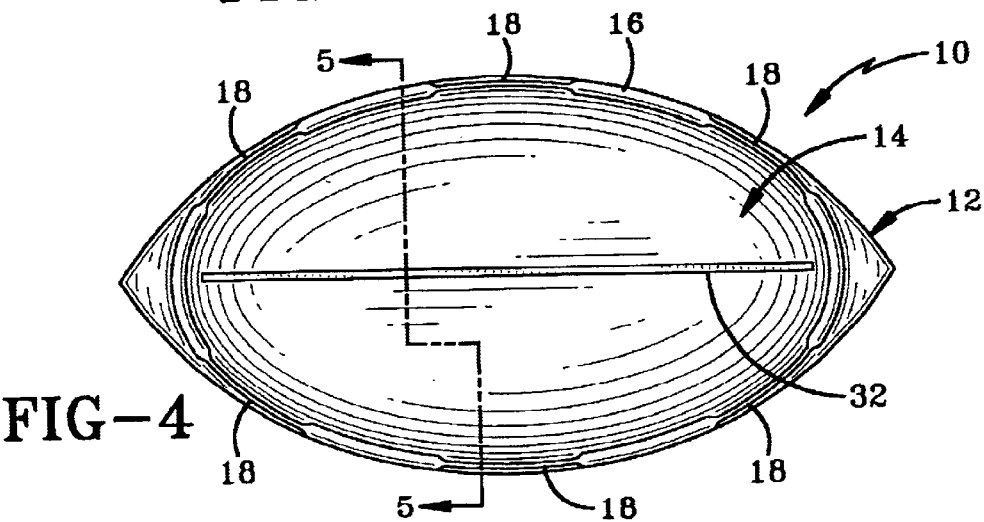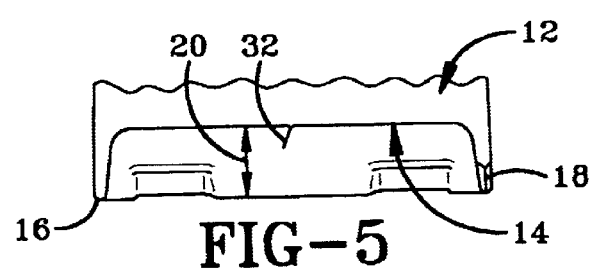

METHOD AND APPARATUS FOR MANUFACTURING A BAG HAVING AN INDENT BOTTOM WALL

CROSS REFERENCE TO RELATED APPLICATIONS

This application is a continuation-in-part of application Ser. No. 10/246,146 filed Sep. 18, 2002 and now abandoned, which claims priority from U.S. Provisional Patent Application Ser. No. 60/323,611 filed Sep. 19, 2001 and now expired; the disclosures of which are incorporated herein by reference.

BACKGROUND OF THE INVENTION

1. Technical Field

The present invention generally relates to storage containers in the field of flexible bags and, more particularly, to stand-up bags having indented bottom walls. Specifically, the present invention relates to apparatus and methods for forming stand-up bags that are fabricated from a flexible material wherein the bottom wall of the bag is reformed into an indented cup with a welded downwardly-projecting rim.

2. Background Information

Various products such as frozen foods and snack foods are sold to consumers in thin-walled flexible bags fabricated from a polymer material. These bags are typically formed from a tube of material that is sealed with spaced flanges. The storage compartment between the flanges is filled with the product.

An undesirable aspect with these bags is that the lower sealed flange prevents the bag from standing in an upright position. The bag thus tips over on its side after it has been opened. The users of these bags desire a bag configuration that will stand on end after the bag is opened.

Different types of stand up bags are known in the art. One type of stand up bag is fabricated from a relatively thick foil material with protruding flanges extending from opposed sides of the bag. Such bags have gained acceptance for certain products but are generally undesirable because the thick material cannot be used for snack food bags without undesirably increasing the cost of the bag. The art thus desires a stand up bag structure and a method for manufacturing the stand up bag wherein the bag may be formed from a relatively inexpensive, thin material.

BRIEF SUMMARY OF THE INVENTION

In one embodiment, the invention provides a method of forming a bag including the steps of: (a) providing a tube of material that will be used to form the body of the bag; (b) positioning the tube of material about a former; (c) closing a portion of the tube to form the bottom closure seam of the bag; (d) folding a portion of the closed tube around a portion of the former to define a rim and a bottom wall by pivoting crimping fingers into the closed portion of the tube; and (e) welding at least one portion of the rim. This method has the advantage that the crimping fingers may be moved in from the sides of tube with the welders.

The invention also provides an apparatus for forming a bag. The apparatus includes a former having at least one weld wall that defines at least one weld opening. A tube of material is positioned around the former. The apparatus further includes at least one arm movable inward from the side of the tube to fold a portion of the tube about the weld wall of the former.

The arm of the apparatus may include a crimping finger that pivots with respect to the arm to engage the tube to fold the tube over the folder where the tube may be welded to form the rim of the bag.

The invention also provides an embodiment wherein the former moves up with respect to the arms to define the correct amount of material to be folded up into the bottom of the bag.

The invention also provides an embodiment wherein the sealer moves down with respect to the former after defining the correct amount of material to be folded up into the bottom of the bag.

BRIEF DESCRIPTION OF THE SEVERAL VIEWS OF THE DRAWINGS

FIG. 2 is a front view of FIG. 1.

FIG. 3 is a side view of FIG. 1.

FIG. 4 is a bottom view of FIG. 1.

FIG. 5 is a section view taken along line 5—5 of FIG. 4.

Similar numbers refer to similar parts throughout the specification.

DETAILED DESCRIPTION OF THE INVENTION

Figure 1:
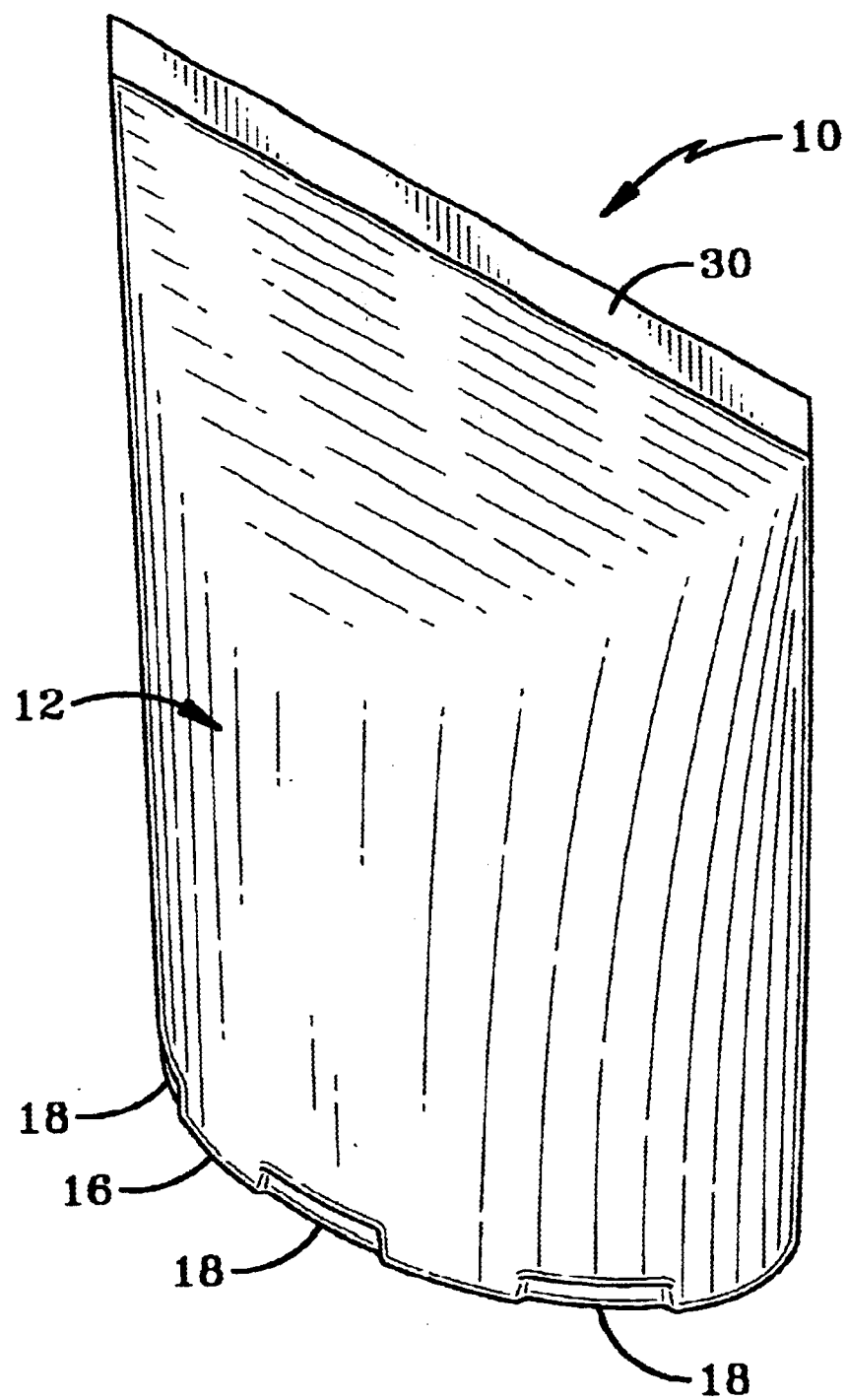
FIG. 1 is a perspective view of the stand up bag of the present invention.

A first embodiment of the stand up bag according to the present invention is indicated generally by the numeral 10 in the accompanying drawings. Bag 10 includes a continuous sidewall 12 and an indented bottom wall 14 that cooperate to define a storage compartment for holding items. As shown in FIG. 5, bottom wall 14 is disposed transverse to sidewall 12 and may be substantially perpendicular to the portions of sidewall 12 adjacent bottom wall 14. The structure of bottom wall 14 allows bag 10 to stand in an upright configuration without tipping over. Bag 10 may have any of a variety of shapes such as the exemplary oval shape shown in the drawings. In other embodiments, the cross section (looking down along the longitudinal axis of the bag) of bag 10 may be rectangular, diamond, or round as shown in FIGS. 6A–6D. Other bag shapes are also within the scope of the invention.

A downwardly projecting rim 16 is formed between sidewall 12 and bottom wall 14. Rim 16 is welded with a plurality of welds 18 that hold the shape of rim 16 and indented bottom wall 14 while bag 10 is in use. Welds 18 also keep bottom wall 14 disposed substantially perpendicular to sidewall 12. In one embodiment of the invention, bottom wall 14 is indented 1½ inches with respect to sidewall 12 as indicated by dimension line 20 in FIG. 5. The 1½ inch indentation dimension (20) has been found to function well with medium, large, and oversize snack food bags. Other indentation dimensions will also function with bag 10. For instance, the indentation dimension may be as short as ¼ inch and as tall as 2½ inch.

Figure 6A:
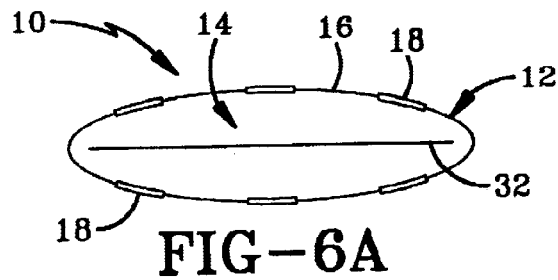
FIGS. 6A–6D shown four different exemplary shapes for the bag of the invention.
Figure 7A:
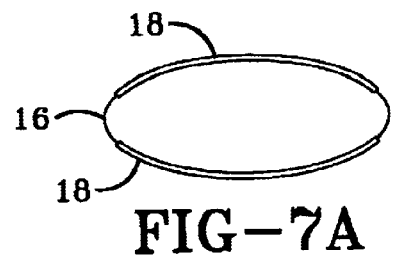
FIGS. 7A–7D show four different exemplary weld patterns for an oval-shaped bag.
Figure 6B:
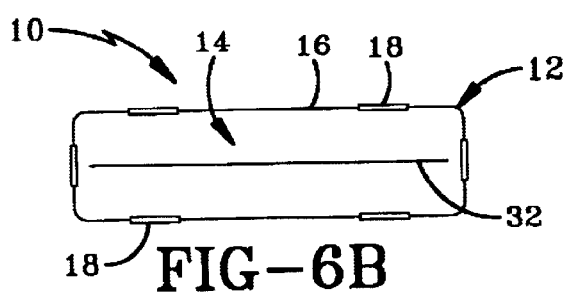
Figure 7B:
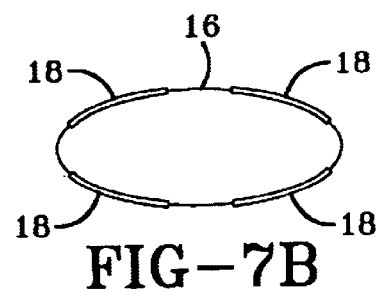
Figure 6C:
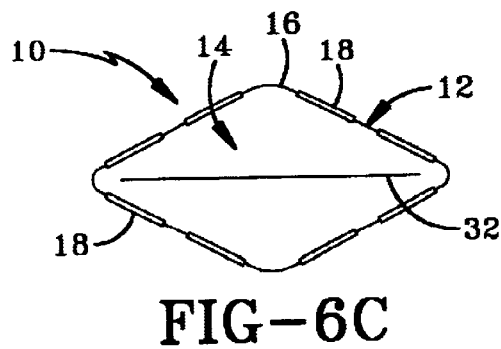
Figure 7C:
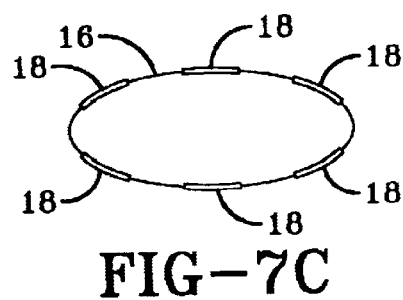
Figure 6D:
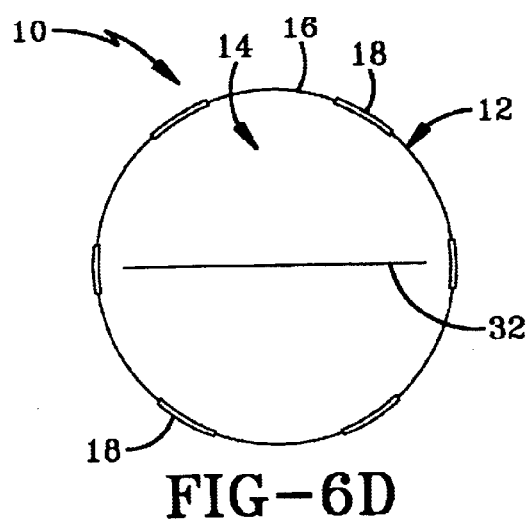
Figure 7D:
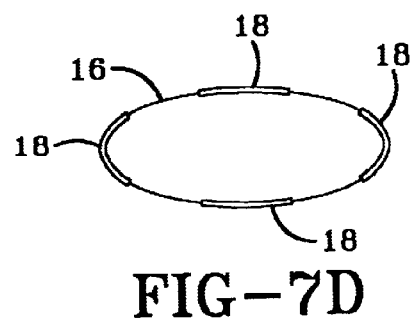

Bag 10 may be provided in a wide variety of shapes and rim 16 may be welded in a wide variety of weld configurations. FIGS. 6A–6D show bottom views of different shapes of bag 10. FIG. 6A shows oval. FIG. 6B shows rectangular. FIG. 6C shows diamond and FIG. 6D shows a round bag. In each of these drawings, the thick line along rim 16 represents the location of weld 18 with each drawing representing one of the variety of possible weld patterns that may be used to hold rim 16 in position. FIGS. 7A–7D show four weld patterns used with an oval bag. Each of these weld patterns may be used with each of the shapes depicted in FIGS. 6A–6D and any bag shapes known to those skilled in the art. In the exemplary embodiment, the ratio of the total weld lengths to the perimeter of rim 16 should be about 75 percent. In other embodiments of the invention, the ratio may be as small as 5% and as large as 95%. Small pinch welds may be used that are not long in length.

Bag 10 further includes a top closure seam 30 and a bottom closure seam 32. Seams 30 and 32 may be positioned with respect to welds 18 as shown in the drawings or turned at any of a variety of angles with respect to welds 18.

Bag 10 may thus stand on rim 16 or bottom wall 14. Sidewall 12 is formed from a continuous tube or a tube formed with a longitudinal overlap seam so that sidewall 12 does not have any protruding flanges. Bag 10 may be fabricated from any of the weldable materials known in the art of manufacturing snack food bags. The structure of the invention allows stand up bag 10 to be manufactured from a thin, flexible chip-bag material.

Figure 8:
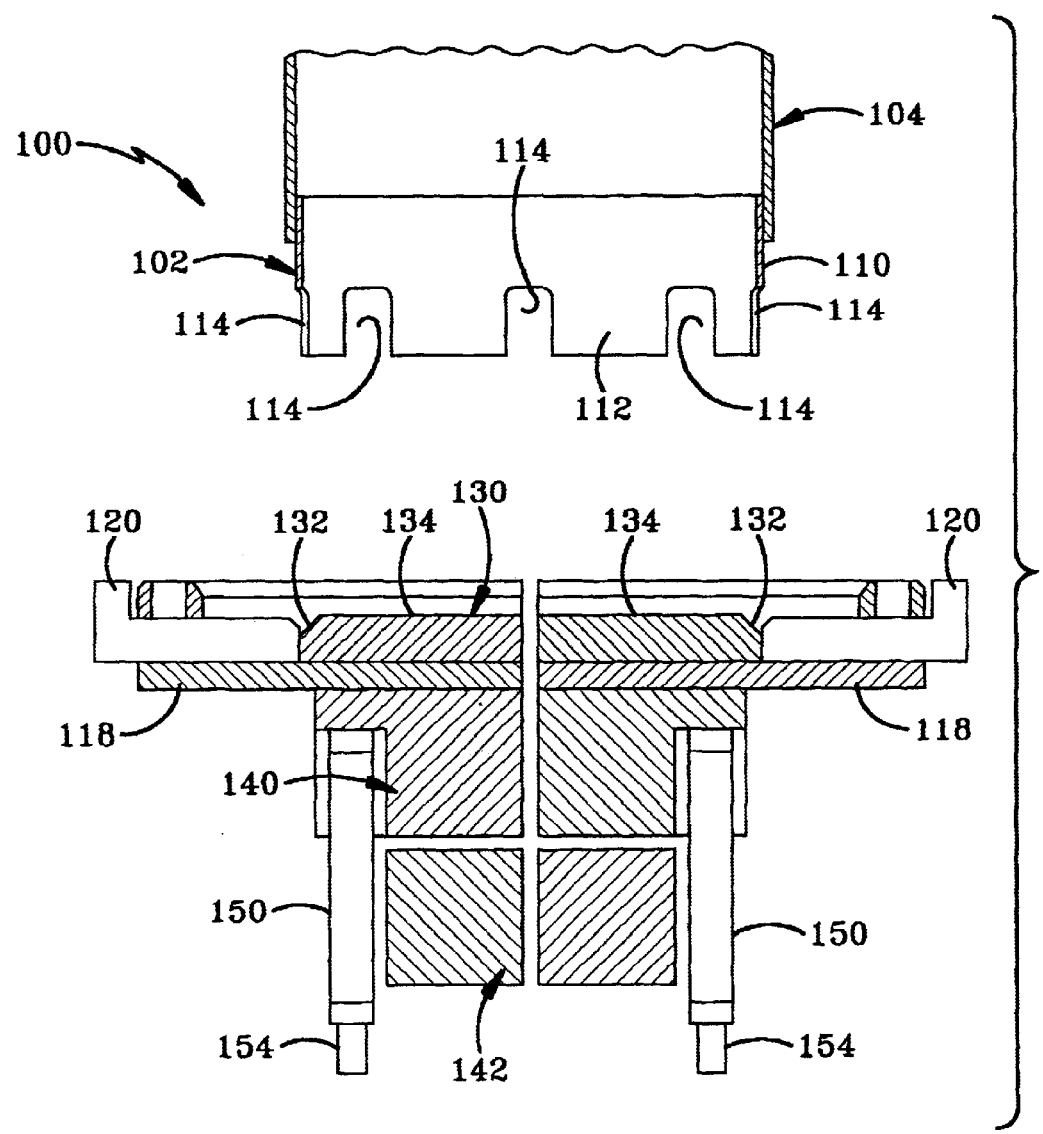
FIG. 8 is a front view of the first embodiment of the apparatus for forming the stand up bag of the invention.
Figure 9:
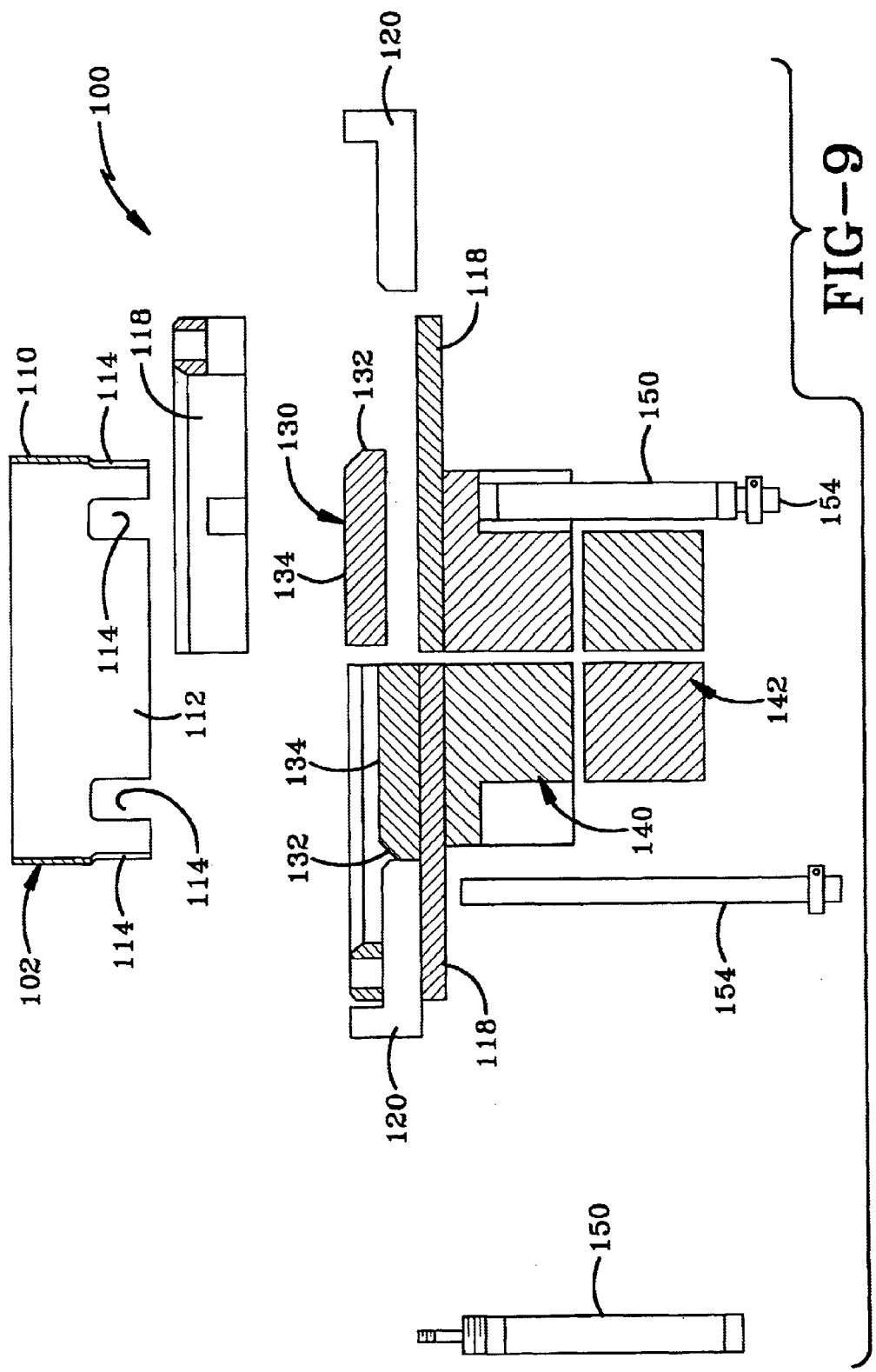
FIG. 9 is another front view of the apparatus for the stand up bag of the invention.
Figure 10:
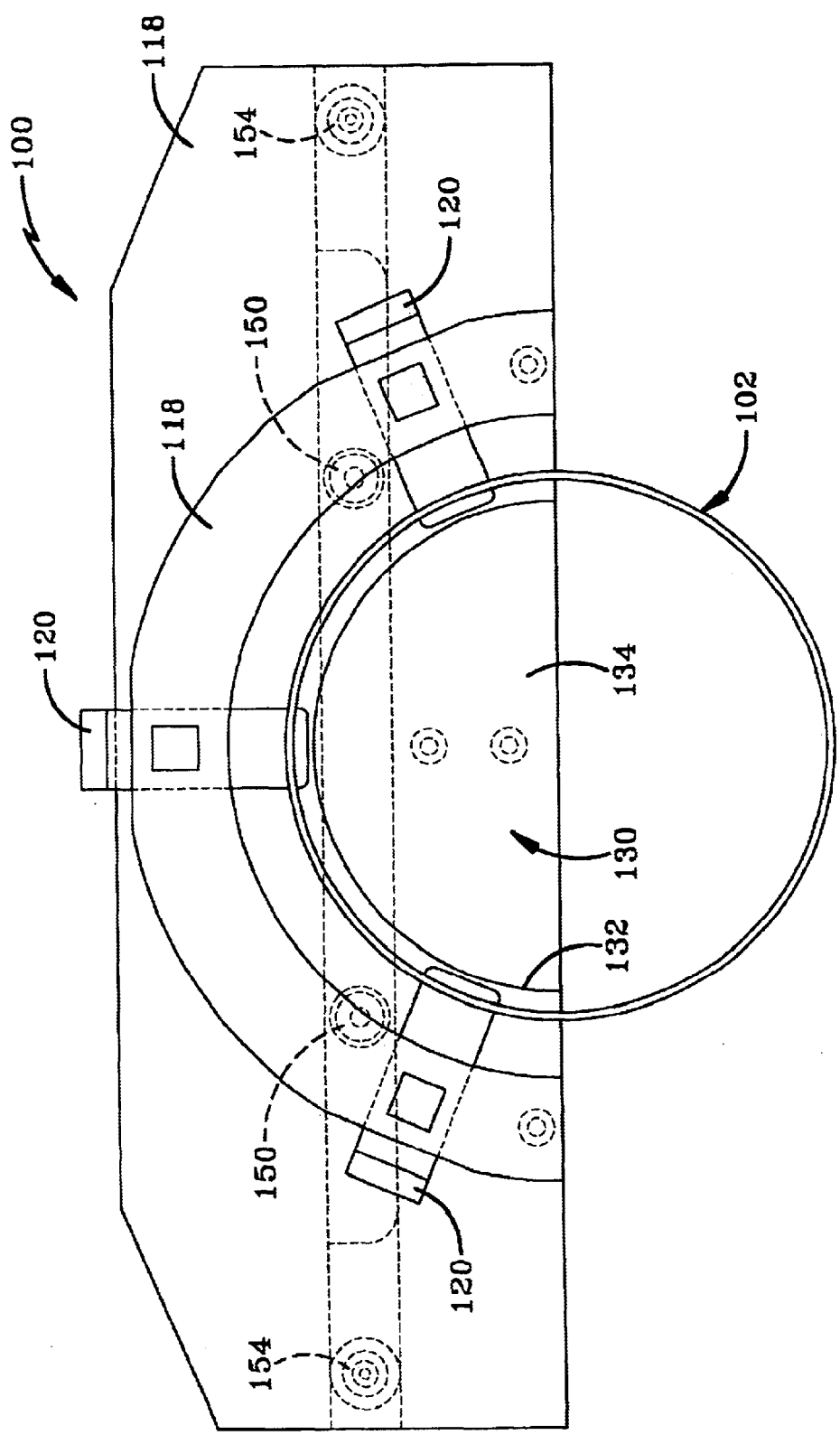
FIG. 10 is a top view of a portion of the apparatus.
Figure 11:
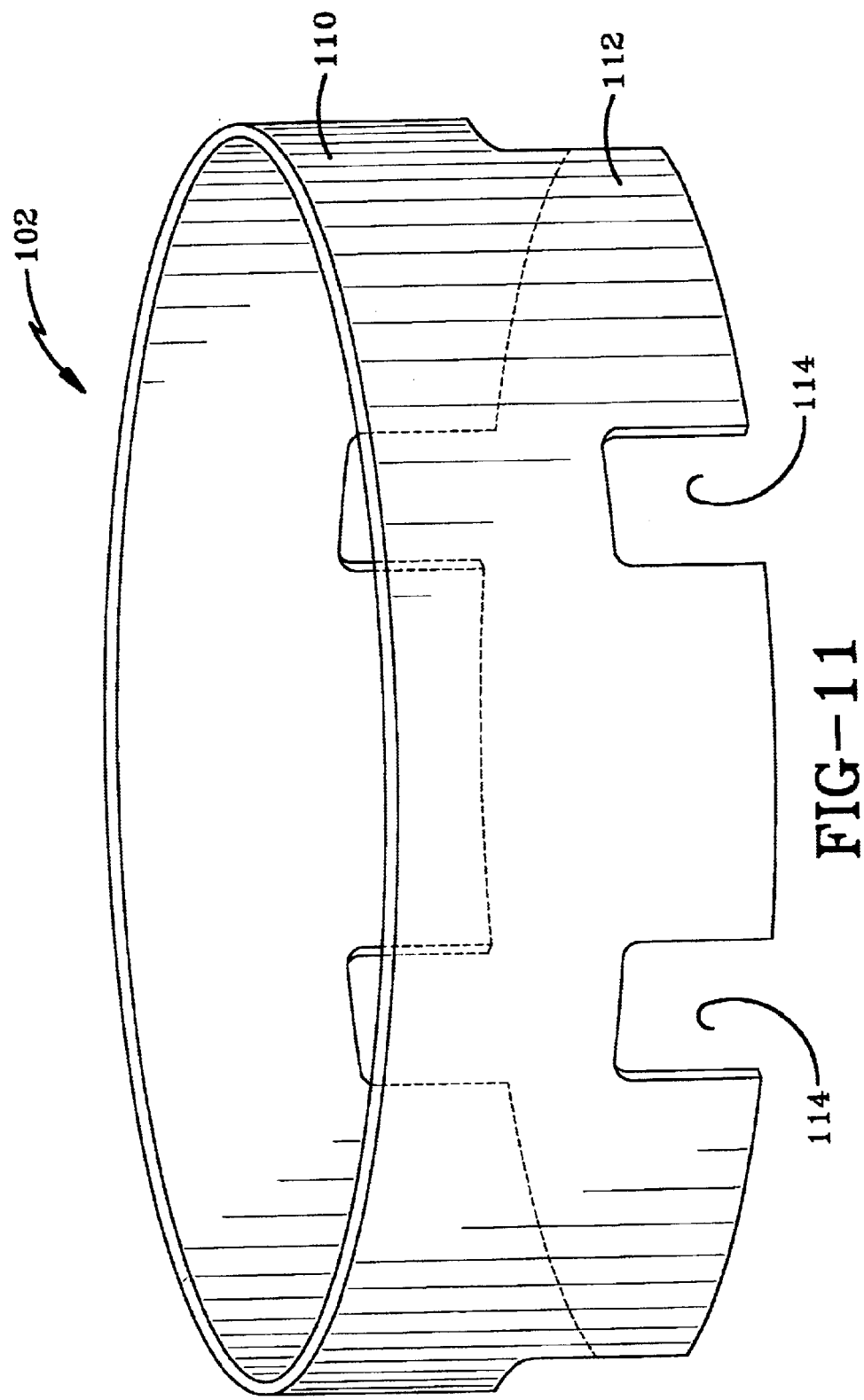
FIG. 11 is a perspective view of the reform collar used to form the rim of the bag.

A first embodiment of the apparatus 100 for manufacturing bag 10 is depicted generally in FIGS. 8–11 for the purpose of introducing some of its elements. FIGS. 8 and 9 depicts a front view of apparatus 100 with some elements depicted in section and other elements exploded for clarity. Apparatus 100 generally includes a collar 102 that extends down from the end of a former 104. Former 104 is used to form a tube 106 (see for example FIG. 12) of material that is used to form the walls of bag 10. The use of former 104 and the process of making tube 106 is known to those skilled in the art and will not be described here in detail. Collar 102 has a cross section that generally matches the shape of former 104 and thus generally matches the shape of the cross section of bag 10. In the exemplary embodiment of the invention depicted in FIGS. 8–11, collar 102 is round and is used to form round bags 10 as shown in FIG. 6D.

Collar 102 is used to form rim 16 by bending the material of bag 10 over collar 102. The upper portion 110 of collar 102 is connected to former 104 with the lower portion 112 of collar 102 extending down free of former 104 so that the material of tube 106 may be wrapped around lower portion 112. The body of lower portion 112 defines a plurality of weld openings 114 positioned at the locations where welds 18 will be formed in rim 16. Openings 114 allow welders 120 to weld the desired areas of rim 16 during the process of forming bag 10.

Welders 120 are carried by a first base member 118. Base member 118 may include several elements as shown in the drawings. For instance, base member 118 may include the lower plate and an outer ring. Base 118 is divided into halves that move apart to allow bag 10 to pass through base 118 as described in more detail below. In other embodiments of the invention, base 118 may be divided into other numbers of elements such as three, four, five, etc. The structure and operation of welders 120 are known to those skilled in the art. Welders 120 are generally configured to melt the material of bag 10 without burning and without melting a hole in the material. Welds 18 thus do not break the integrity of bag 10 such that bag 10 remains hermetically sealed.

In the exemplary embodiment of apparatus 100, each welder 120 is movable between a resting position and a welding position with welder 120 being biased toward the resting position. Welder 120 may be biased with a spring or other mechanism known to those skilled in the art.

A guide 122 (FIG. 12) is associated with each welder 120. Each guide 122 is mounted to first base 118. Base 118 may include blocks or define an opening that defines a slide path for guide 122. Each guide 122 is movable between first and second positions within the slide path defined by base 118. When guide 122 is in the first position, welder 120 is in the resting position. As guide 122 moves to the second position, welder 120 is moved inwardly to the welding position. In the exemplary embodiment of the invention, each guide 122 includes an angled surface 124 that engages a corresponding angled surface 126 defined by a portion of welder 120. The engagement of angled surfaces 124 and 126 as guide 122 moves upwardly cause welder 120 to move inwardly. This configuration allows the movement and positioning of welders 120 to be precisely controlled and adjusted. The movement of guides 122 may be controlled by any of a variety of actuators (not shown) and linkages as are needed. For instance, an actuator may be associated with each guide 122 or a suitable linkage may be provided that links each guide 122 to a single actuator. In other embodiments, guides 122 may be removed and the movement of welders 120 may be achieved directly with actuators.

Apparatus 100 further includes a dome former 130 that helps form bottom wall 14 during the reform process. Dome former 130 may be mounted to base 118. Former 130 is aligned with collar 102 and may be concentric with collar 102 so that they may cooperate during the reform process described below. Dome former 130 includes a sidewall 132 having a straight lower portion and a curved portion that merges with a relatively flat upper wall 134. Sidewall 132 is aligned with welders 120 so that portions of rim 16 may be pinched between or pinched adjacent sidewall 132 and welder 120 to form welds 18. The thickness of dome former 130 is substantially equal to the height of bottom wall 14 as indicted by dimension 20 in FIG. 5.

Dome former 130 is divided into the same number of pieces as base 118 so that former 130 may be moved out of the way as described below. In the exemplary embodiment, dome former 130 is divided into two pieces.

Apparatus 100 further includes a set of upper seal welding jaws 140 and a set of bottom seal welding jaws 142. Jaws 140 and 142 include opposed members that are adapted to cooperate to form seals 30 and 32. Upper seal welding jaws 140 are used to form seal 32 while bottom seal welding jaws 142 are used to form seal 30. Jaws 140 and 142 may also be used to sever the material of tube 106. The structure and operation of jaws 140 and 142 are known to those skilled in the bag forming art.

In apparatus 100, base 118 is configured to be moved upwardly toward collar 102 with actuators 150 such as the air cylinders depicted in the drawings. Base 118 rides on guides 154 between the disengaged position depicted in FIGS. 12, 14, and 15 and the engaged position depicted in FIG. 13. In the engaged position, collar 102 is disposed adjacent wall 132 where welders 120 may be moved inwardly to the welding position where the inner end of welder 120 is disposed adjacent wall 132. Welders 120 and dome former 130 move with base 118 between these positions.

Figure 12:
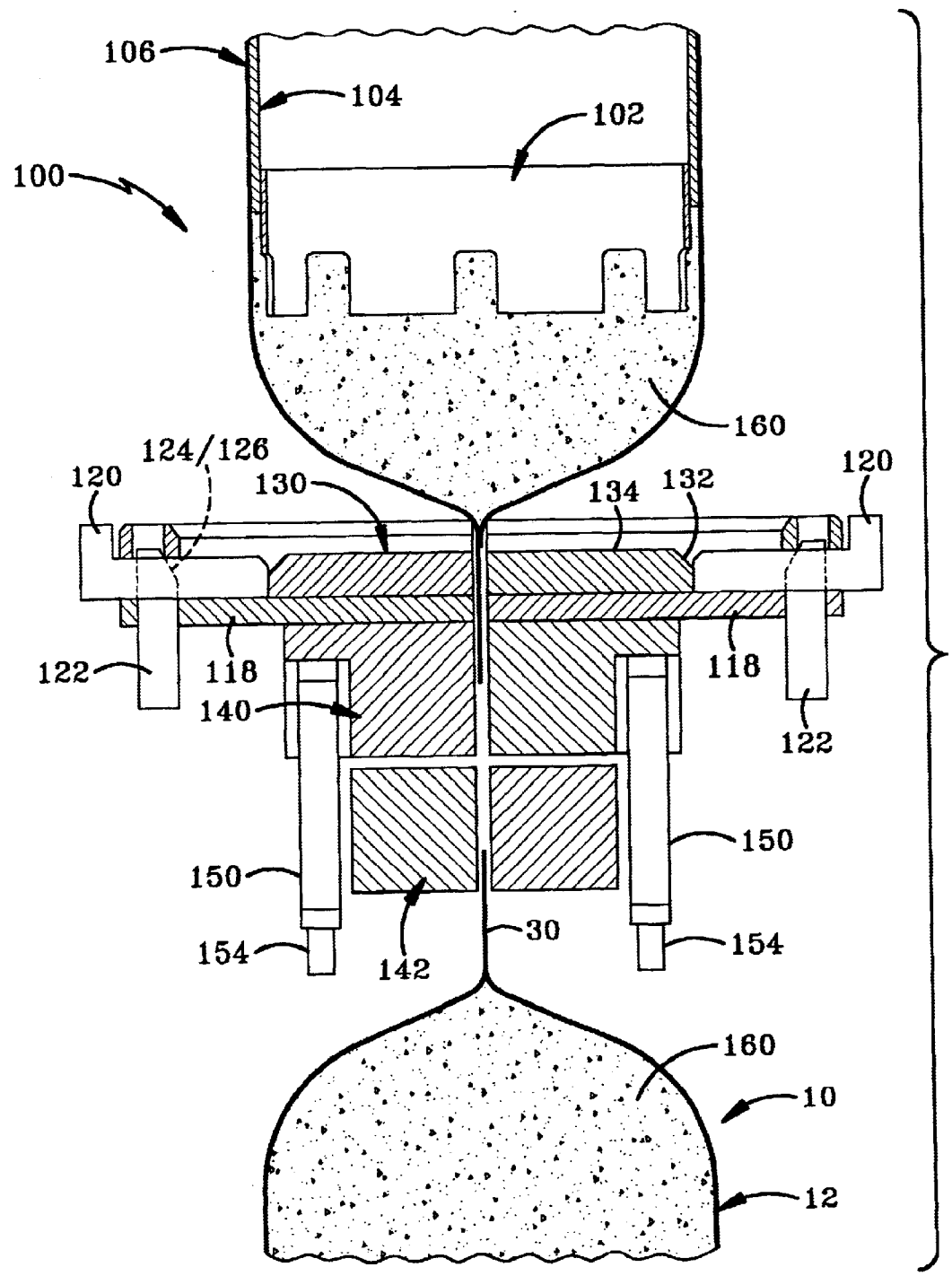
FIG. 12 is a front view showing the first step of the first embodiment of the method of the invention.
Figure 13:
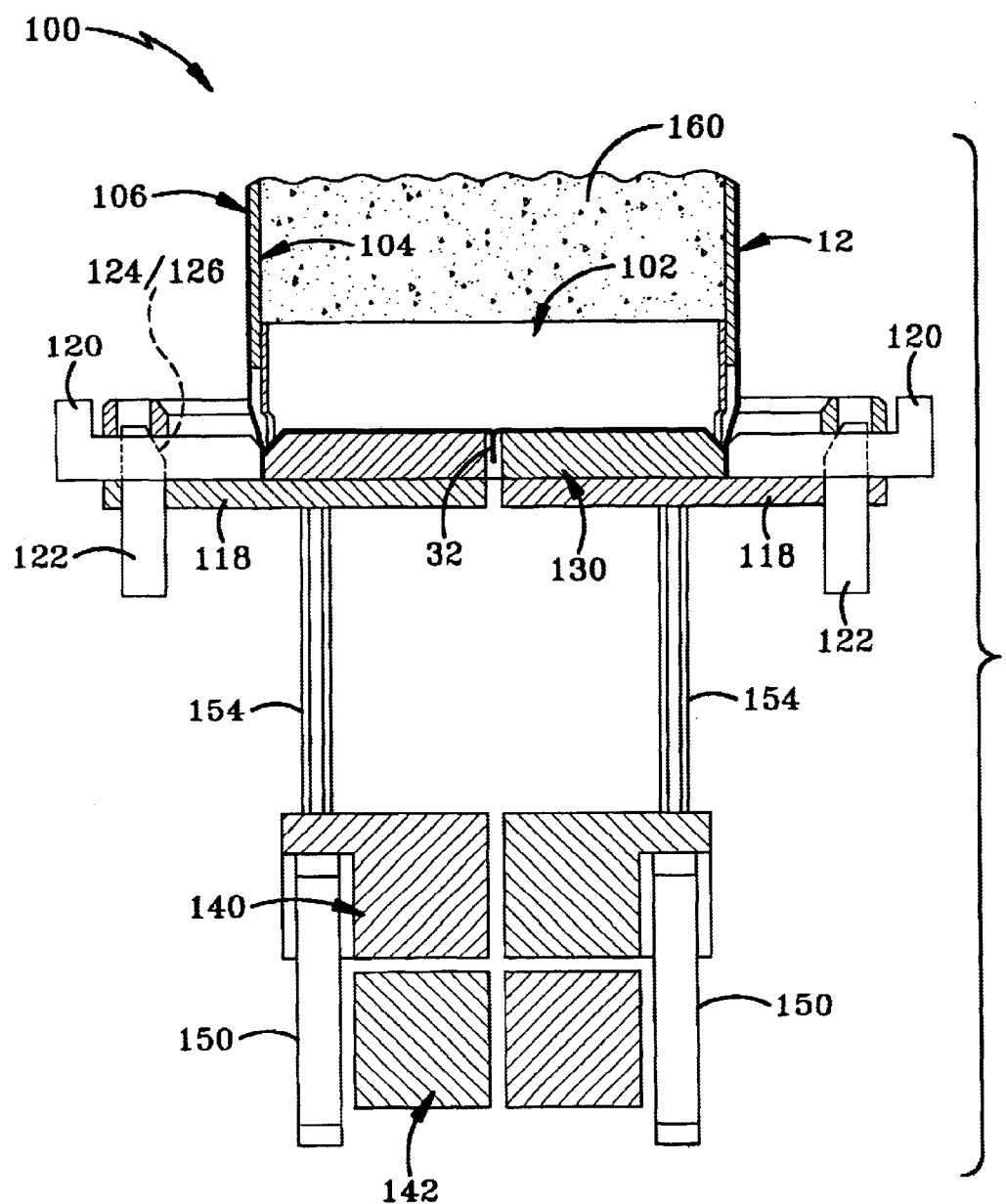
FIG. 13 is a front view showing the second step of the first embodiment of the method of the invention.

A first method for forming bag 10 is depicted in FIGS. 12–15 and is performed with apparatus 100. In FIG. 12, a finished bag 10 is depicted at the bottom of the drawing with the lower portion of another bag beginning to be formed. At this point, bottom seal welding jaws 142 have just cut bag 10 away from tube 106 so that the next bag may be formed.

In this position, welders 120 and dome former 130 are spaced from collar 102 in the disengaged position. Tube 106 has been drawn over former 104 and collar 102 with a portion of tube 106 being positioned between jaws 140 and 142. Jaws 140 and 142 clamp together to form seals 30 and 32 and to sever tube 106 between seals 30 and 32. After tube 106 is cut to form bag 10 at the bottom of the page, jaws 140 and 142 are opened slightly (such as ⅛th inch) to allow the lower bag to drop from apparatus 100.

At this point, the material 160 that is being placed into bags 10 starts filling the bag being formed through former 104 and collar 102. Actuators 150 then start moving dome former 130 and welders 120 up toward the engaged position depicted in FIG. 13. Dome former 130 bends tube 106 around the lower edge of collar 102 to form rim 16. Welders 120 are then moved to the welding position to form welds 18.

Figure 14:
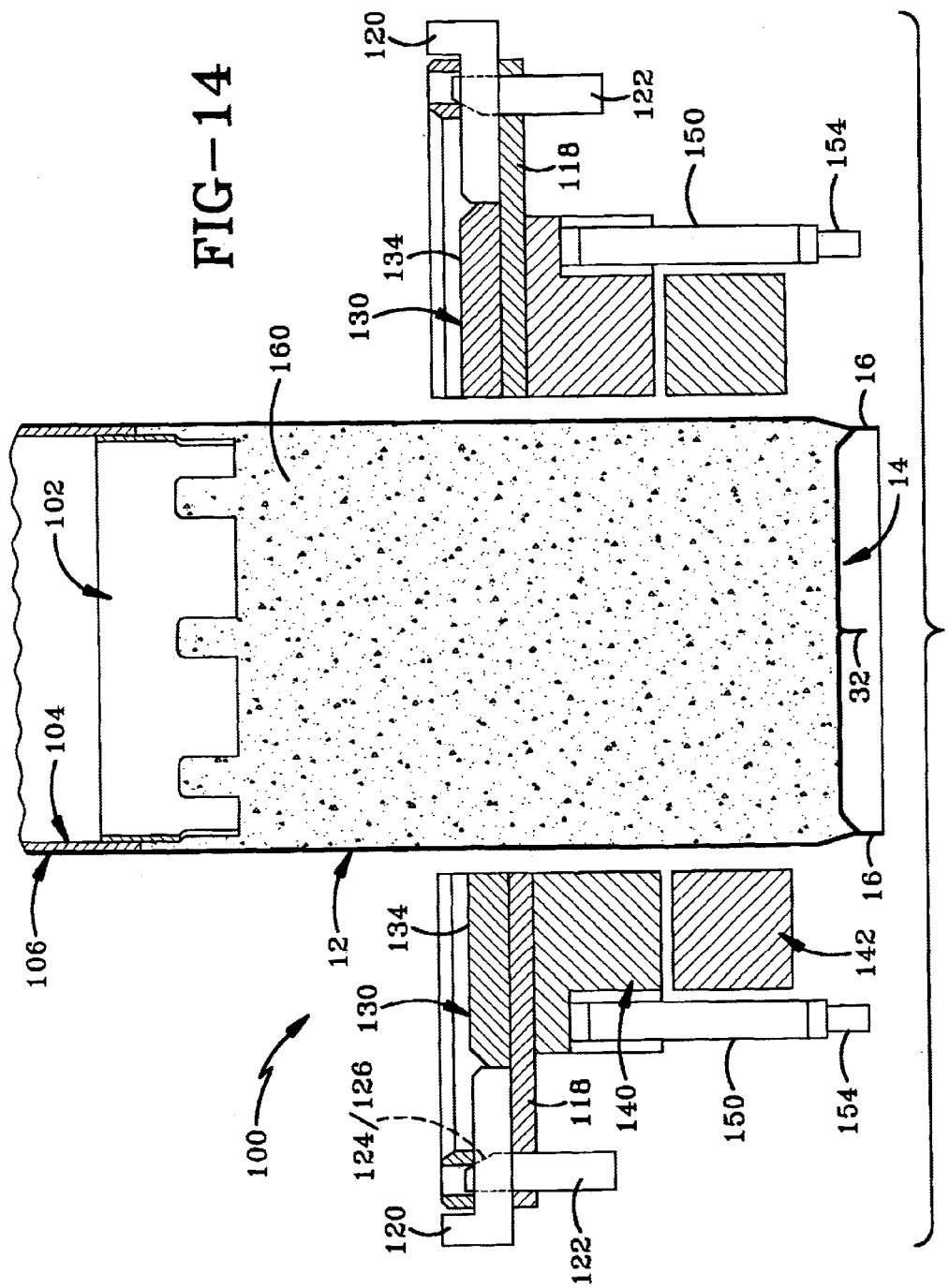
FIG. 14 is a front view showing the third step of the first embodiment of the method of the invention.
Figure 15:
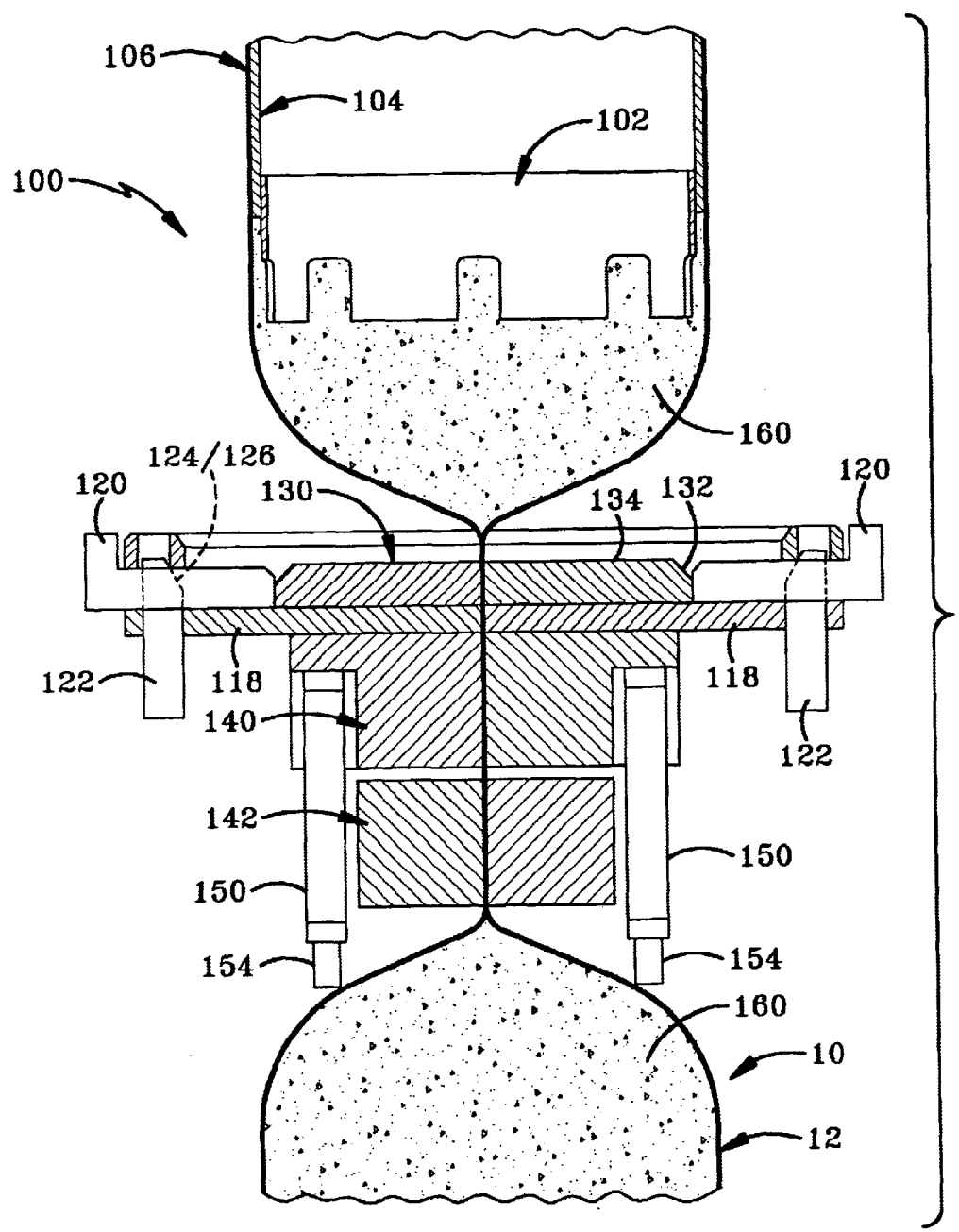
FIG. 15 is a front view showing the fourth step of the first embodiment of the method of the invention.
Figure 16:
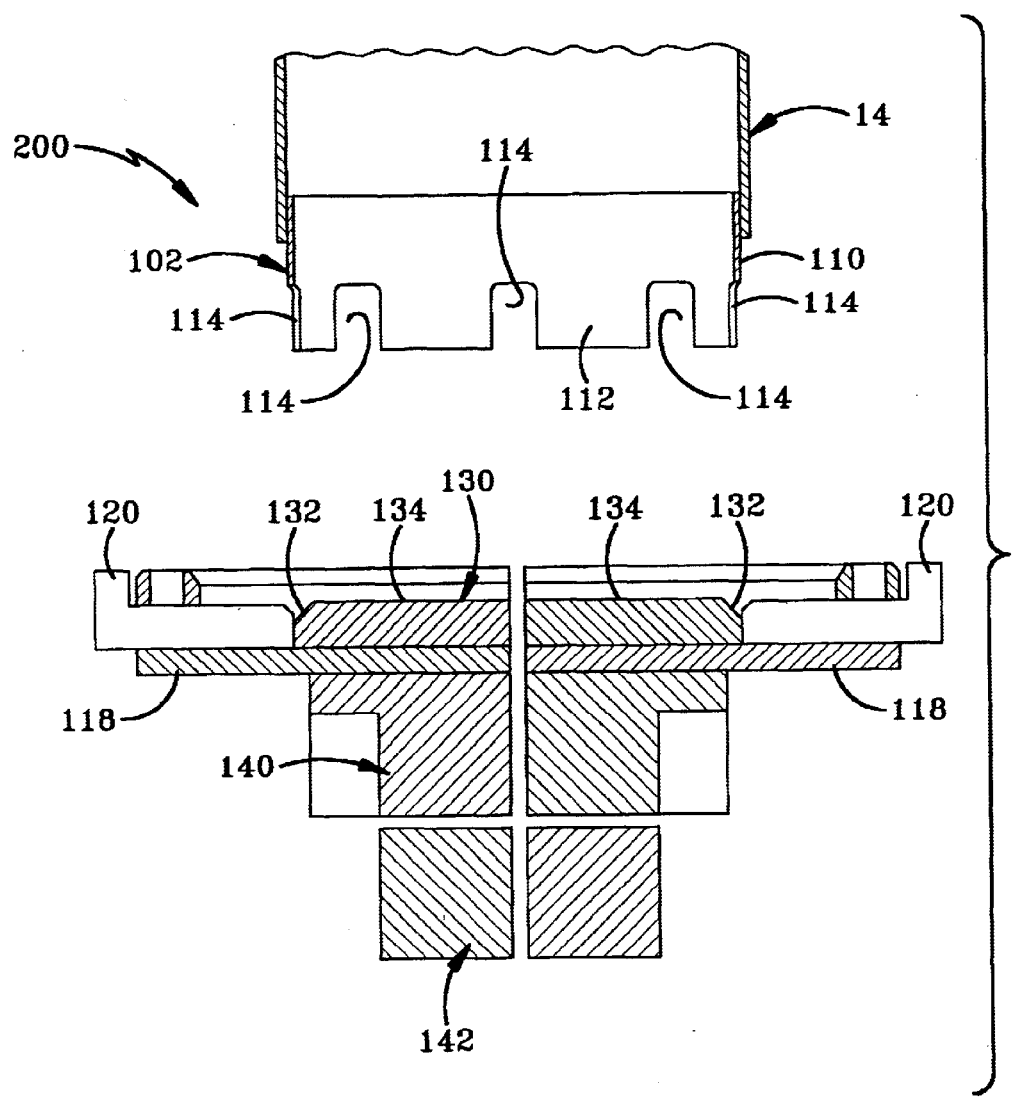
FIG. 16 is a front view of the second embodiment of the apparatus for forming the stand up bag of the invention.

After welds 18 are formed, welders 120 and jaws 140/142 move down to the disengaged position while moving to an open position as depicted in FIG. 14. Tube 106 continues to move down through these open elements while material 160 continues to be dispensed. Tube 106 moves down until an appropriate amount of material 160 has been dispensed. Tube 106 then continues to move to provide slack for jaws 140 and 142. Once enough slack is provided, jaws 140 and 142 move inwardly to form seals 30 and 32 and to cut the finished bag 10 from tube 106 as depicted in FIG. 15.

The second embodiment of the apparatus of the present invention is indicated generally by the numeral 200 in FIGS. 16–20. Apparatus 200 includes many of the same elements as apparatus 100 and the same reference numbers are used to identify these elements. Apparatus 200 differs from apparatus 100 in that welders 120 and dome former 130 do not move up and down and actuators 150 and guides 154 have been removed. In apparatus 200, collar 102 and former 104 move down from the disengaged position of FIG. 17 to the engaged position of FIG. 18 to form welds 18.

Figure 17:
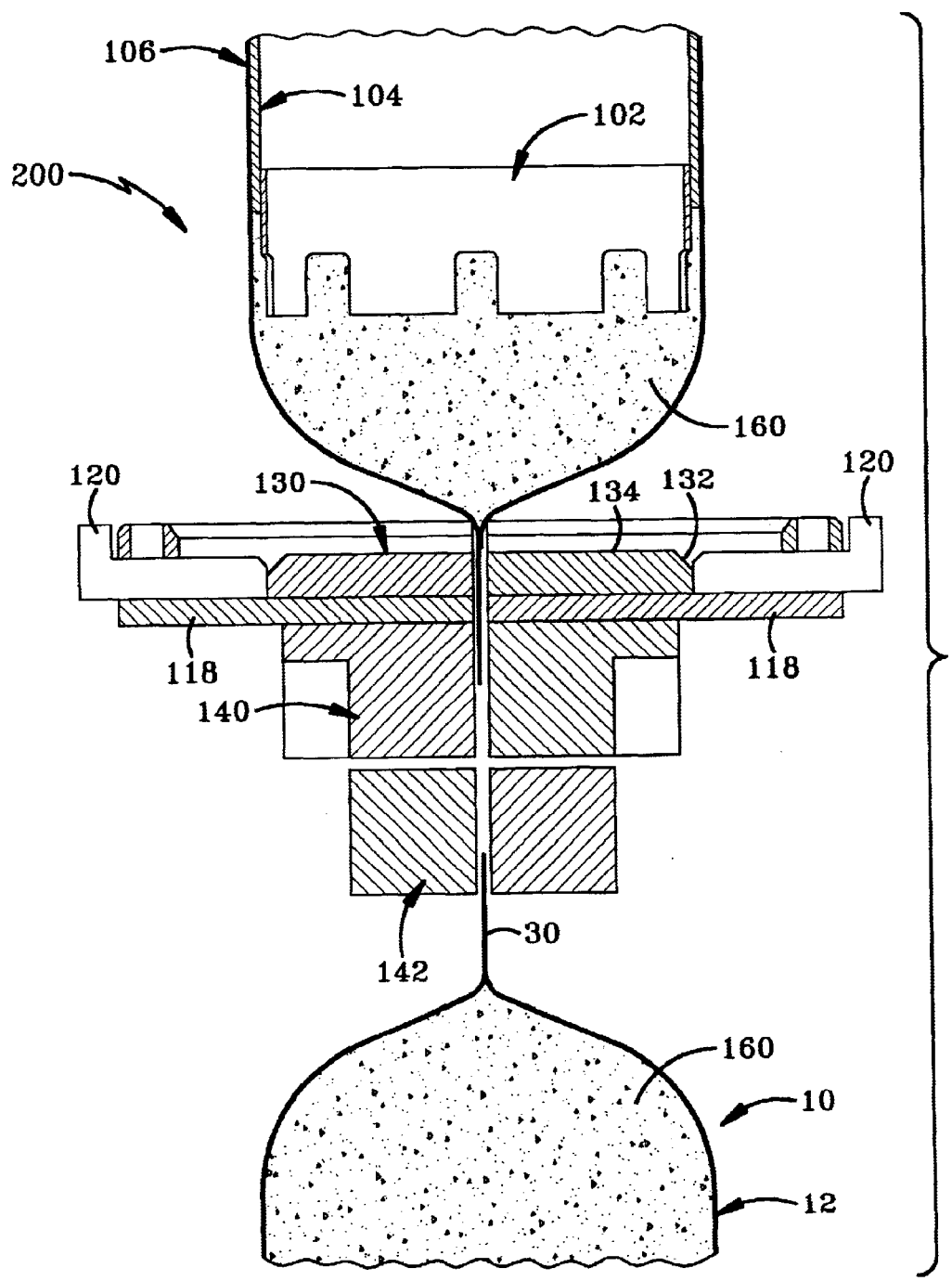
FIG. 17 is a front view showing the first step of the second embodiment of the method of the invention.
Figure 18:
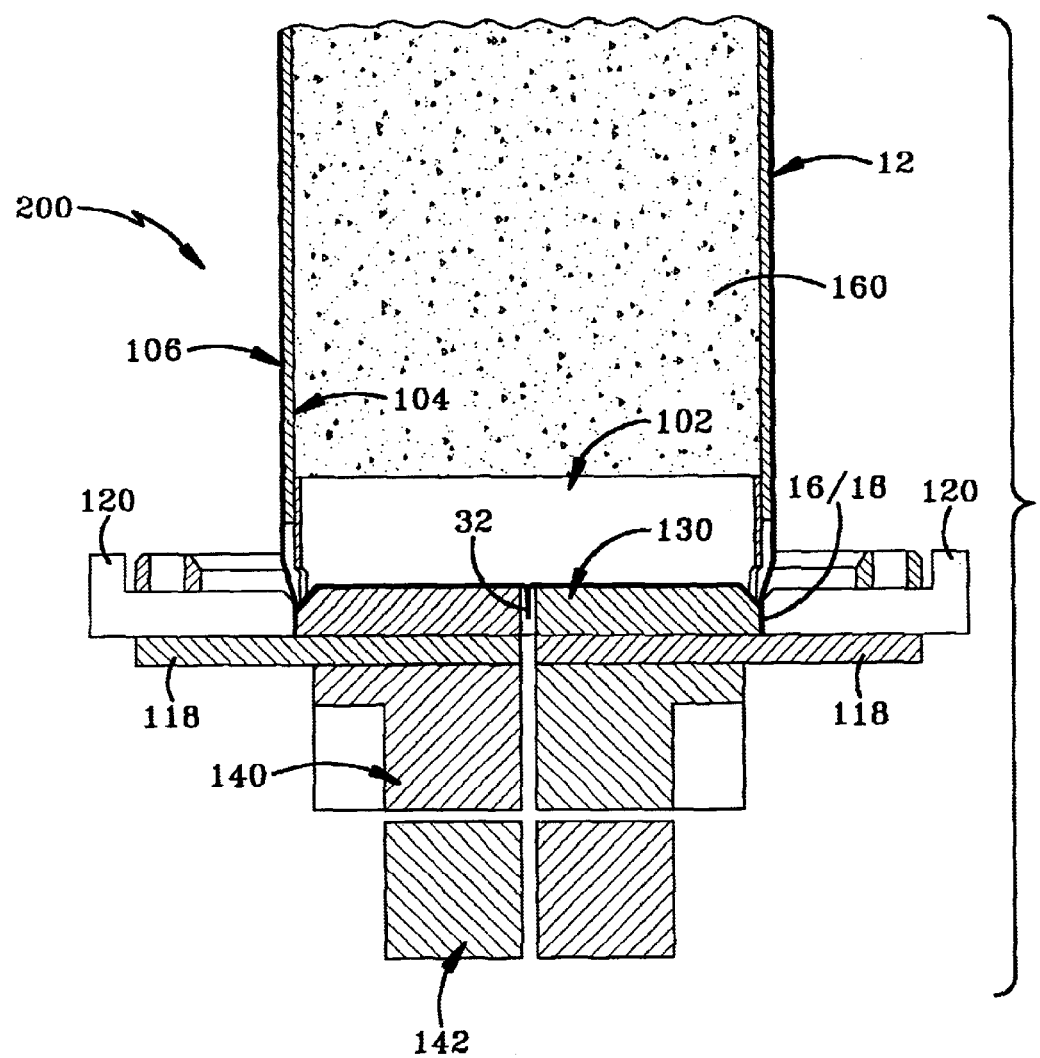
FIG. 18 is a front view showing the second step of the second embodiment of the method of the invention.

A second method for forming bag 10 is depicted in FIGS. 17–20 and is performed with apparatus 200. In FIG. 17, a finished bag 10 is depicted at the bottom of the drawing with the lower portion of another bag beginning to be formed. At this point, bottom seal welding jaws 142 have just cut bag 10 away from tube 106 so that the next bag may be formed.

In this position, welders 120 and dome former 130 are spaced from collar 102 with collar 102 in the disengaged position. Tube 106 has been drawn over former 104 and collar 102 with a portion of tube 106 being positioned between jaws 140 and 142. Jaws 140 and 142 clamp together to form seals 30 and 32 and to sever tube 106 between seals 30 and 32. After tube 106 is cut to form bag 10 at the bottom of the page, jaws 140 and 142 are opened slightly to allow the lower bag to drop from apparatus 100.

At this point, the material 160 that is being placed into bags 10 may start entering the bag through former 104. An actuator (not shown) then starts moving collar 102 and former 104 down from the disengaged position to the engaged position depicted in FIG. 18. Dome former 130 bends tube 106 around the lower edge of collar 102 to form rim 16. Welders 120 are then moved to the welding position to form welds 18.

Figure 19:
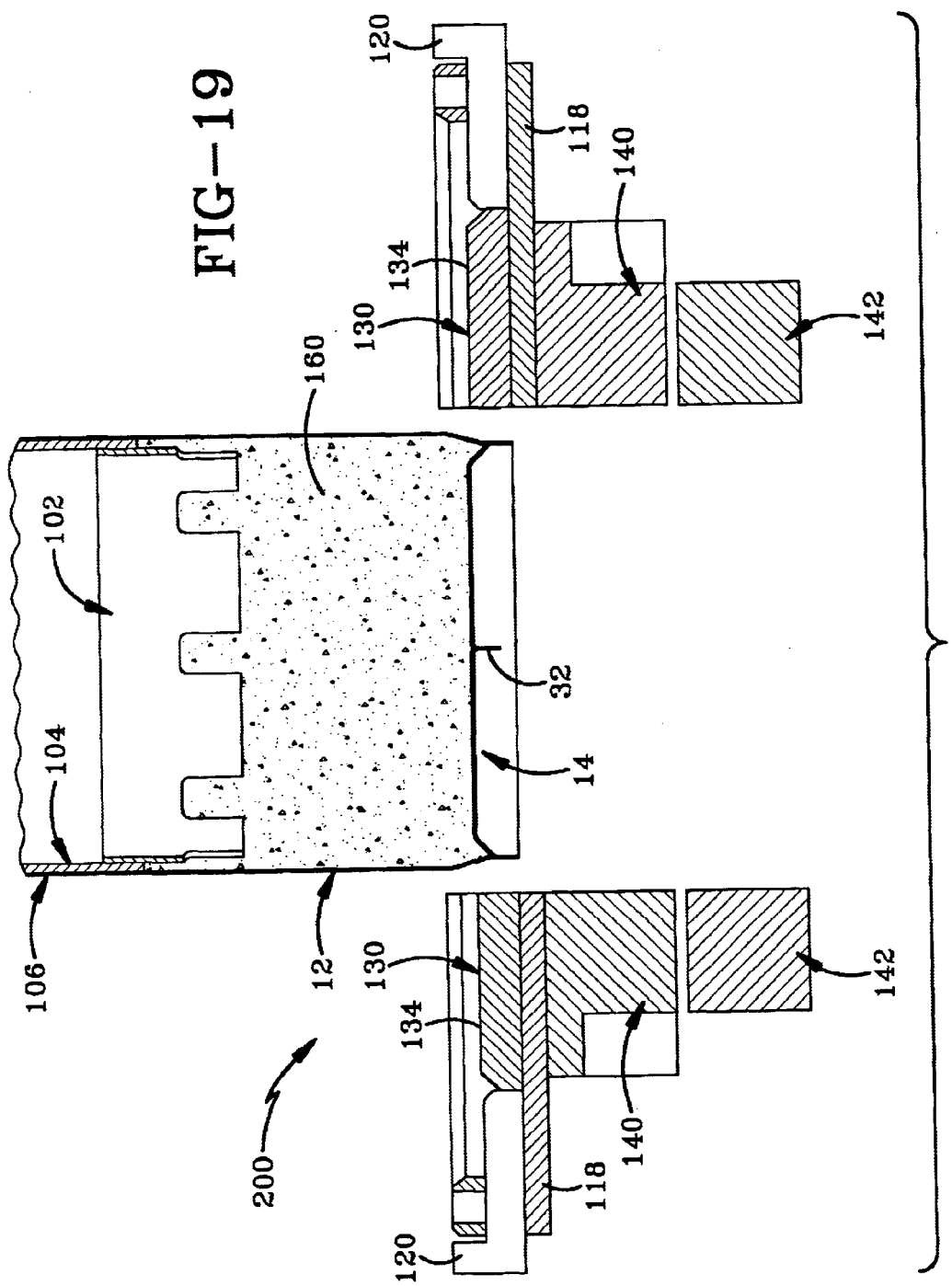
FIG. 19 is a front view showing the third step of the second embodiment of the method of the invention.
Figure 20:
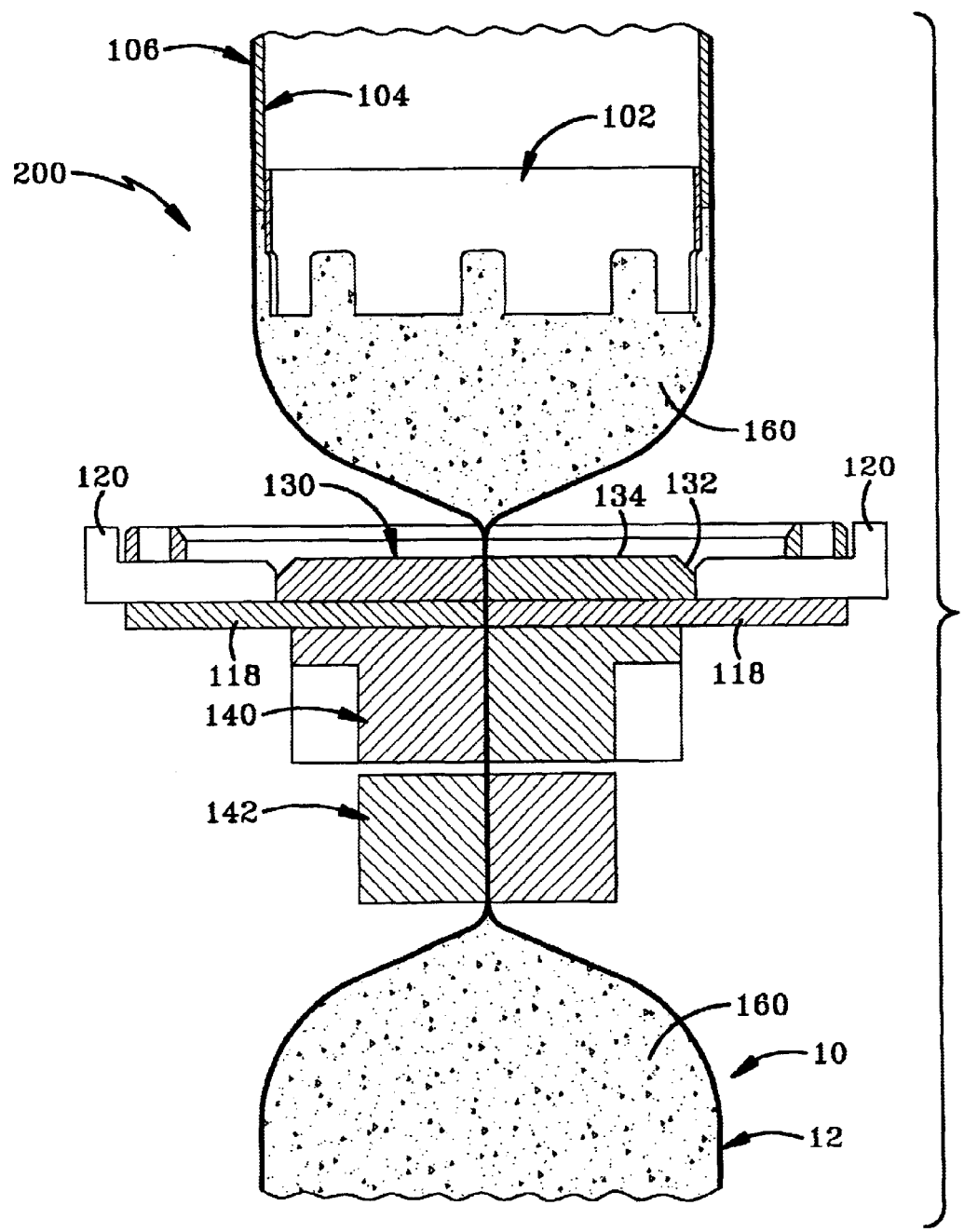
FIG. 20 is a front view showing the fourth step of the second embodiment of the method of the invention.

After welds 18 are formed, collar 102 and former 104 moves up to the disengaged position while jaws 140 and 142 and welders 120 move to an open position as depicted in FIG. 19. Tube 106 continues to move down while material 160 continues to be dispensed. Tube 106 continues to move down until an appropriate amount of material 160 has been dispensed. Tube 106 then continues to move to provide slack for jaws 140 and 142. Once enough slack is provided, jaws 140 and 142 move inwardly to form seals 30 and 32 and to cut the finished bag 10 from tube 106 as depicted in FIG. 20.

The second embodiment of the apparatus of the present invention is indicated generally by the numeral 300 in FIGS. 21–24. Apparatus 300 includes many of the same elements as apparatus 100 and the same reference numbers are used to identify these elements. Apparatus 300 differs from apparatus 100 and 200 in that both welders 120 and dome former 130 move up with collar 102 and former 104 moving down.

Figure 21:
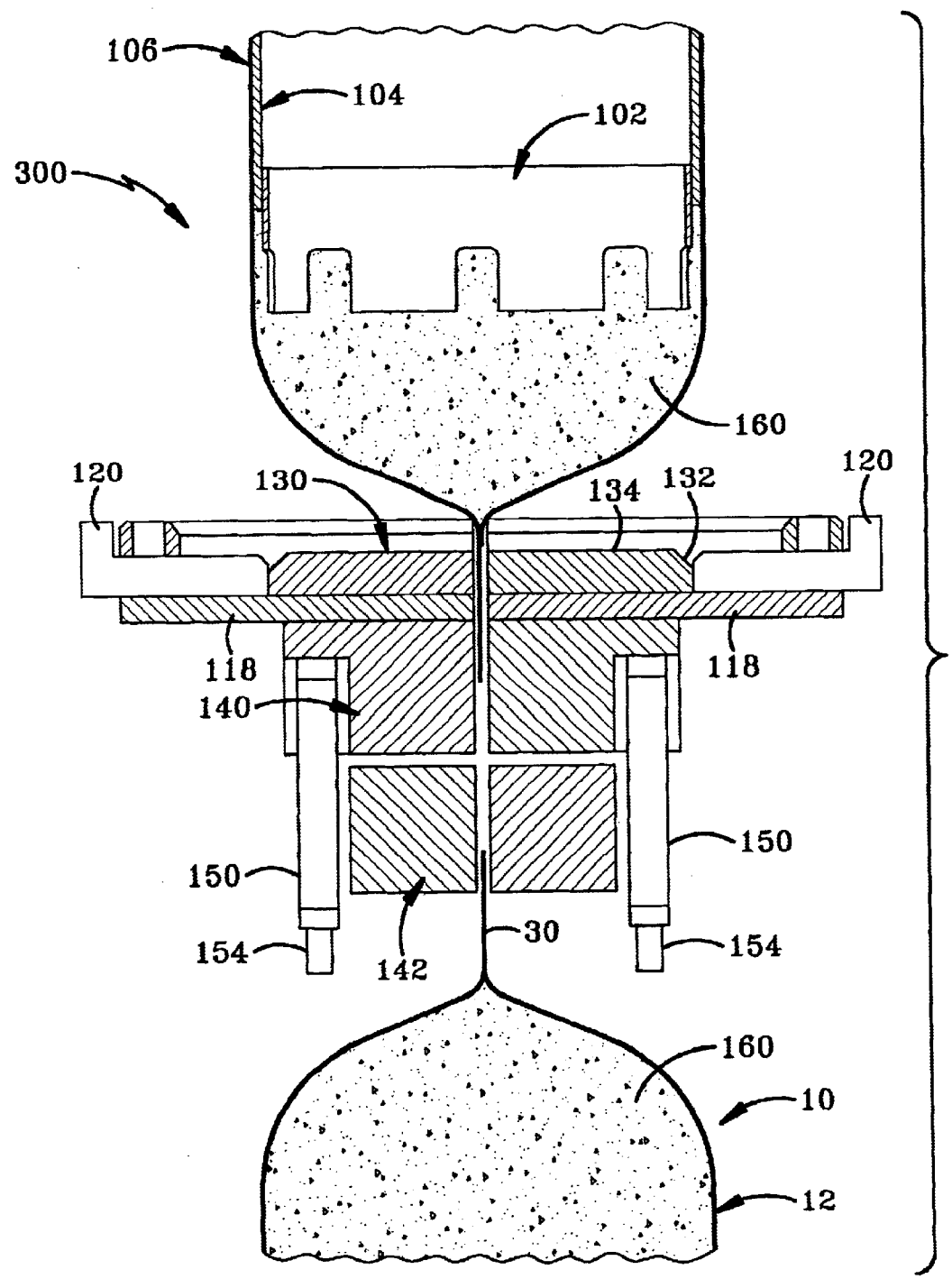
FIG. 21 is a front view showing the first step of the third embodiment of the method of the invention.
Figure 22:
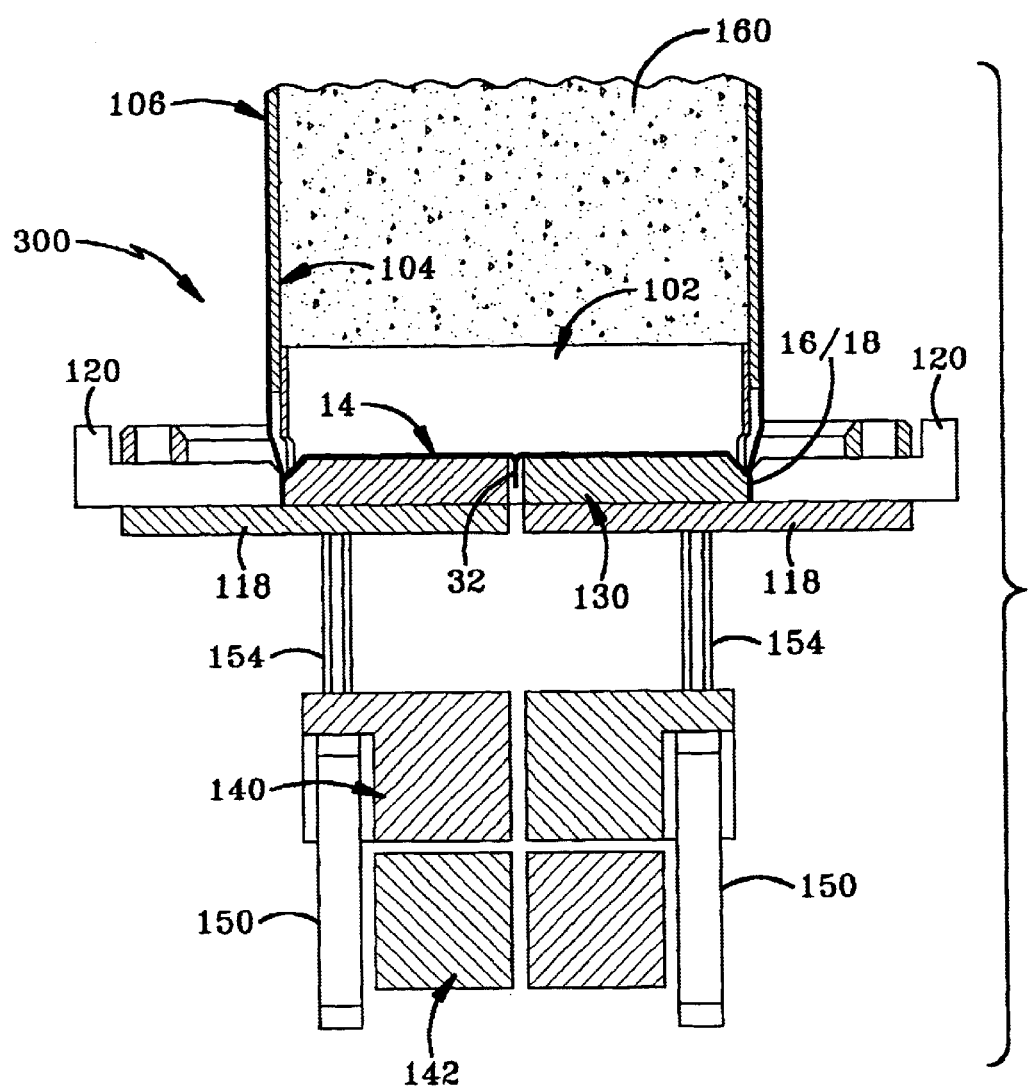
FIG. 22 is a front view showing the second step of the third embodiment of the method of the invention.

A third method for forming bag 10 is depicted in FIGS. 21–24 and is performed with apparatus 300. In FIG. 21, a finished bag 10 is depicted at the bottom of the drawing with the lower portion of another bag beginning to be formed. At this point, bottom seal welding jaws 142 have just cut bag 10 away from tube 106 so that the next bag may be formed.

In this position, welders 120 and dome former 130 are spaced from collar 102 with collar 102 in the disengaged position. Tube 106 has been drawn over former 104 and collar 102 with a portion of tube 106 being positioned between jaws 140 and 142. Jaws 140 and 142 clamp together to form seals 30 and 32 and to sever tube 106 between seals 30 and 32. After tube 106 is cut to form bag 10 at the bottom of the page, jaws 140 and 142 are opened slightly to allow the lower bag to drop from apparatus 100.

At this point, the material 160 that is being placed into bags 10 may start entering the bag through former 104. An actuator (not shown) then starts moving collar 102 and former 104 down from the disengaged position to the engaged position depicted in FIG. 22. At the same time, actuators 150 move dome former 130 and welders 120 up toward the engaged position depicted in FIG. 22. Dome former 130 bends tube 106 around the lower edge of collar 102 to form rim 16. Welders 120 are then moved to the welding position to form welds 18.

Figure 23:
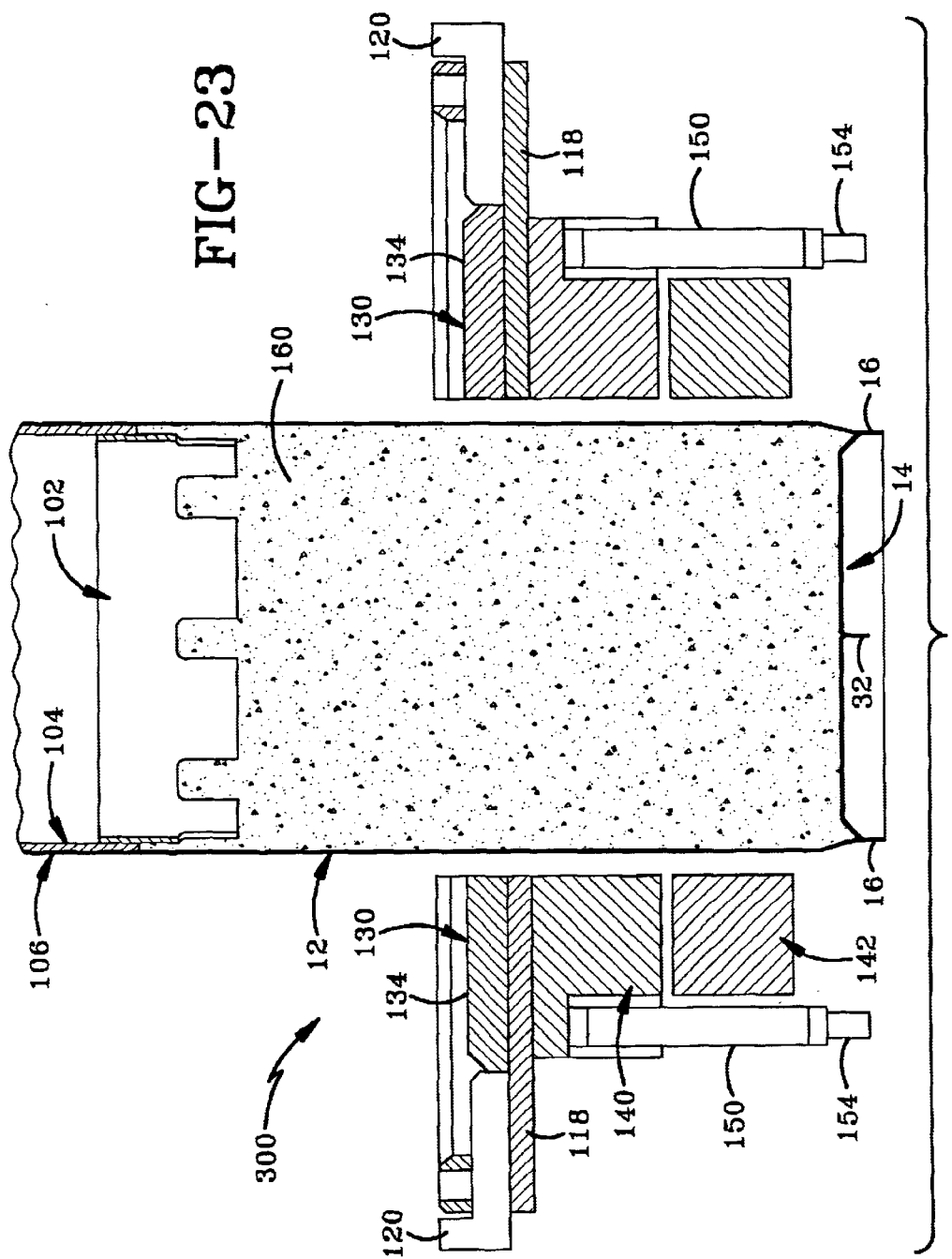
FIG. 23 is a front view showing the third step of the third embodiment of the method of the invention.
Figure 24:
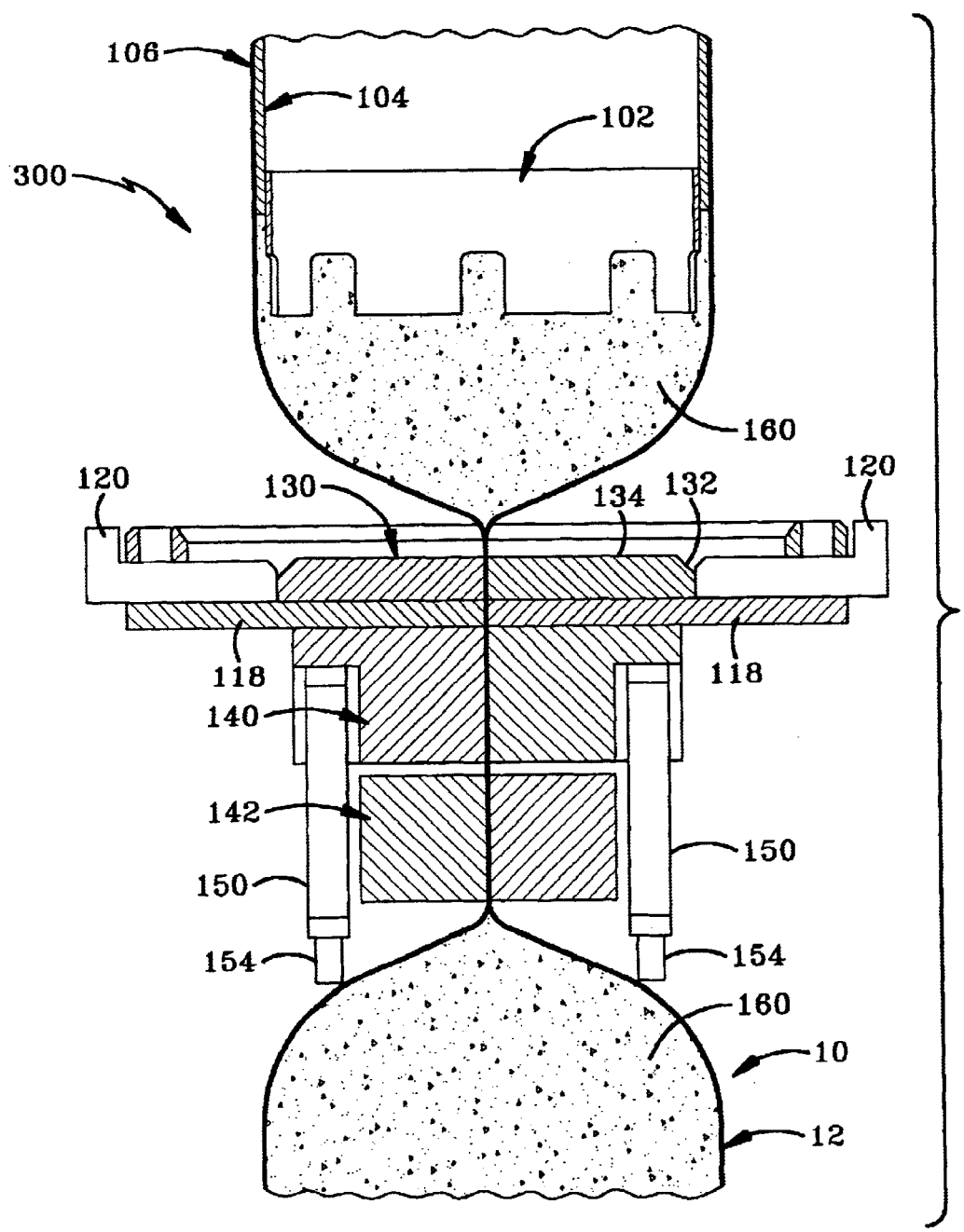
FIG. 24 is a front view showing the fourth step of the third embodiment of the method of the invention.

After welds 18 are formed, collar 102 and former 104 move up to the disengaged position while jaws 140 and 142 and welders 120 move to an open position as depicted in FIG. 23. Tube 106 continues to move down while material 160 continues to be dispensed. Tube 106 continues to move down until an appropriate amount of material 160 has been dispensed. Tube 106 then continues to move to provide slack for jaws 140 and 142. Once enough slack is provided, jaws 140 and 142 move inwardly to form seals 30 and 32 and to cut the finished bag 10 from tube 106 as depicted in FIG. 20.

Each of these methods forms bags at a rate that is only slightly slower than—or the same as—prior art bag manufacturing processes. The methods allow rim 16 to be formed while the bag is being filled with material 160 so that extra time is not needed for the welding step.

An alternative apparatus for forming stand-up bag 10 of the invention is indicated generally by the numeral 201 in FIGS. 25–38. An alternative embodiment of a method for forming bag 10 may be performed by apparatus 201. In general, apparatus 201 includes at least one, but preferably two or more, retractable and extendable arms 202 that carry crimping fingers 204 and welders 206. Crimping fingers 204 cooperate with a former 208 and welders 206 to form rim 16 on bag 10.

Figure 25:
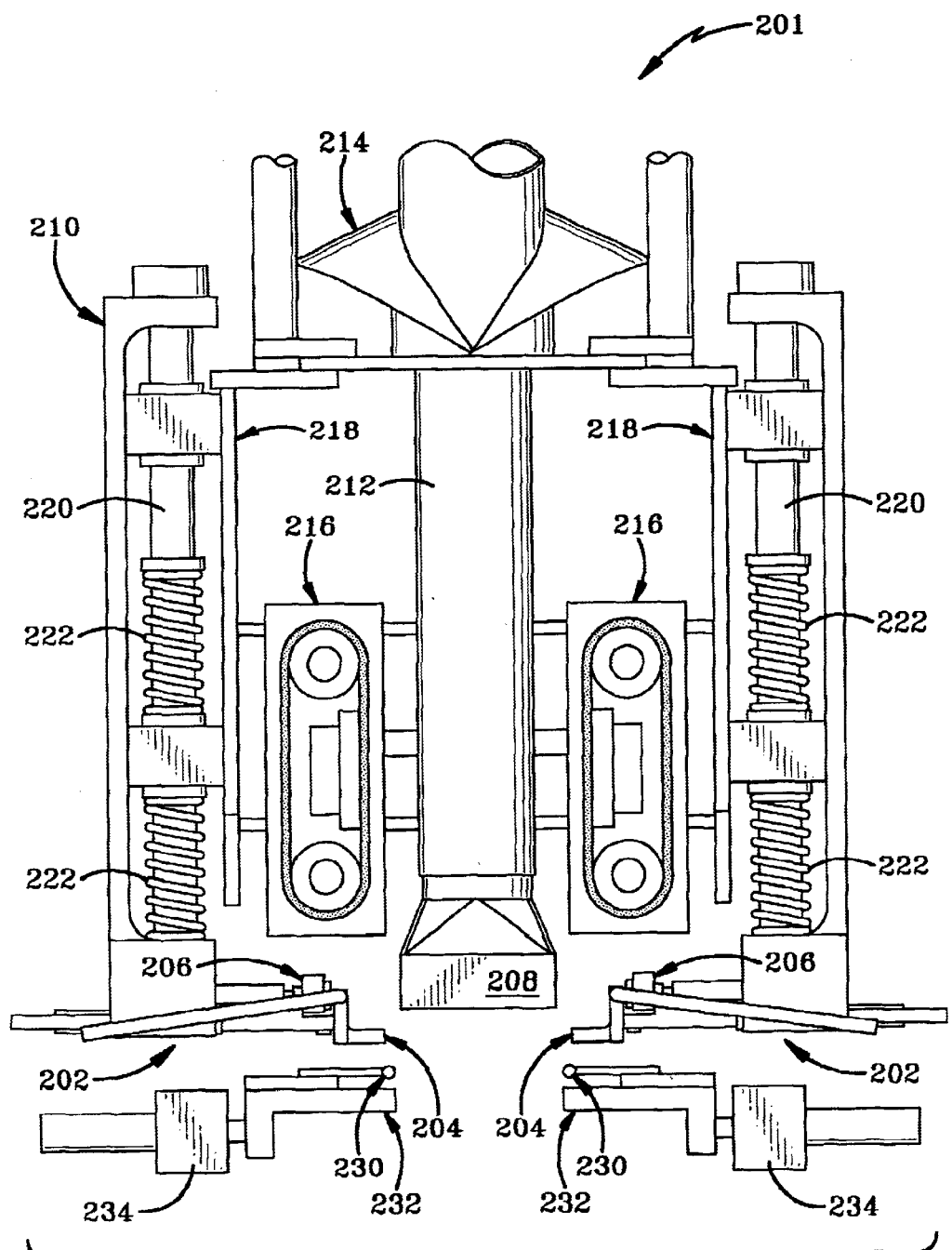
FIG. 25 is a front elevation view of an alternative embodiment of the apparatus for forming the stand-up bag.
Figure 29:
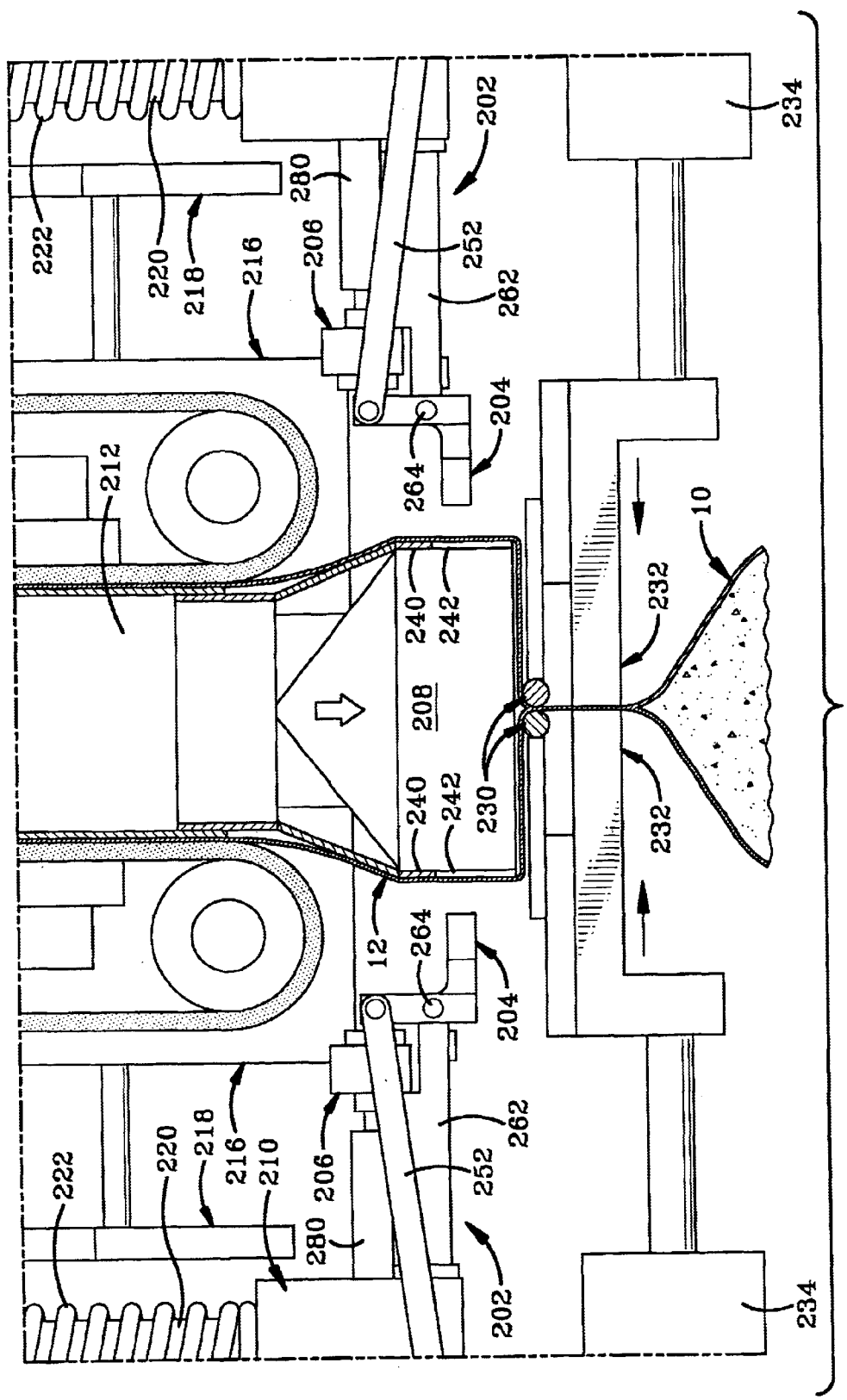
FIG. 29 is a front elevation view of the apparatus sealing the top of one bag and the bottom of the next successive bag.
Figure 30:
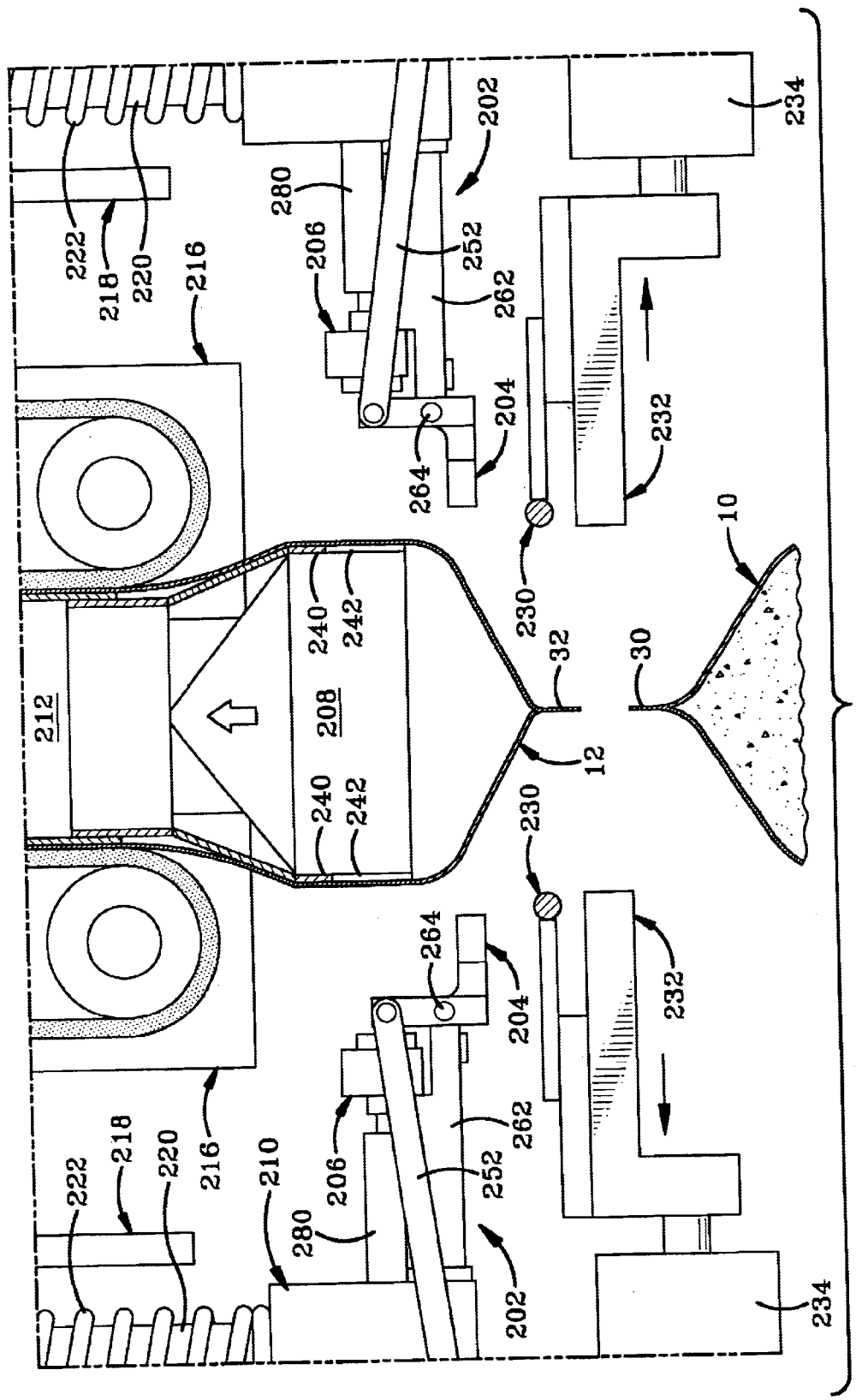
FIG. 30 is a front elevation view of the apparatus with the former moved up to the welding position with the sealers and cutter moved to the inactivated position.

Turning first to FIG. 25, apparatus 201 includes a frame 210 that carries a forming tube 212 with a collar 214 that is adapted to bend a flat section of bag material into a tube about forming tube 212. Drive assemblies 216 adapted to move the tube of material downwardly are disposed about forming tube 212. Former 208 is carried at the bottom of former tube 212. Former 208 is movable between an extended position (FIG. 29) and a retracted or welding position (FIG. 30). There are numerous manners to accomplish this movement. In the exemplary embodiment of the invention, former 208, former tube 212, collar 214, and drive assemblies 216 are mounted to a carriage 218 that is movable up and down with respect to frame 202. Carriage 218 rides on slides 220 with springs 222 biasing the movement of carriage 218. Springs 222 may be designed to have a relaxed position that corresponds with either the extended position or retracted position of former 208. In the exemplary embodiment, the relaxed position of springs 222 corresponds with the extended position of former 208.

Apparatus 201 further includes a bottom sealer 230, a top sealer and cutter 232 disposed below former 208. The drawings depict elements 230 and 232 pinching together from the sides of the drawings sheet. The inventors note that a better manner of accomplishing the pinching is to turn elements 230 and 232 90 degrees so that they move into and out of the drawings page. The particular configuration depends on the orientation of former 208 and space limitations for the equipment. Top sealer/cutter 232 and bottom sealer 230 include heated elements and/or a blade adapted to weld opposed sections of the bag material together to form top 30 and bottom 32 flanges of bags 10. As shown in FIGS. 29 and 30, top sealer/cutter 232 is also configured to cut the tube of material 12 to separate a finished bag 10 and the next successive bag 10. Elements 230 and 232 are movable between retracted or resting positions (FIG. 30) that allow bags 10 to pass through elements 230 and 232 and extended or welding positions (FIG. 29). Appropriate actuators 234 are used to accomplish the movement.

Figure 26:
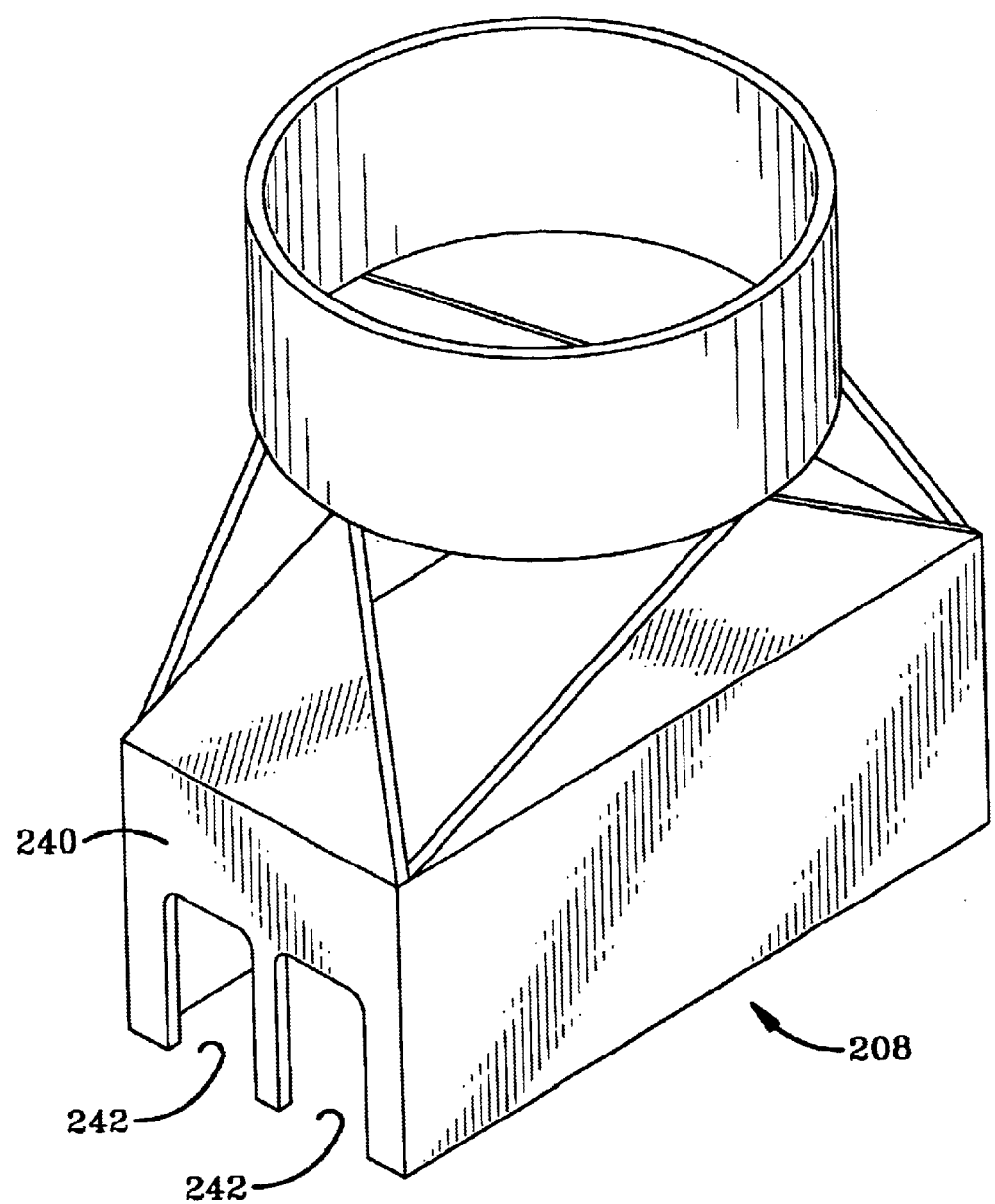
FIG. 26 is a perspective view of the former over which the downwardly-extending rim is formed.

Former 208 is shown in FIG. 26 and includes forming walls 240 that each defines at least one weld opening 242. In the exemplary embodiment, former 208 includes a pair of opposed forming walls 240 with each wall 240 defining a pair of weld openings 242. In other configurations, former 208 may include three of four forming walls 240. Walls 240 have smooth lower edges to avoid tearing tube 12 when tube 12 is wrapped about walls 240 as shown in FIGS. 33–36.

Figure 35:
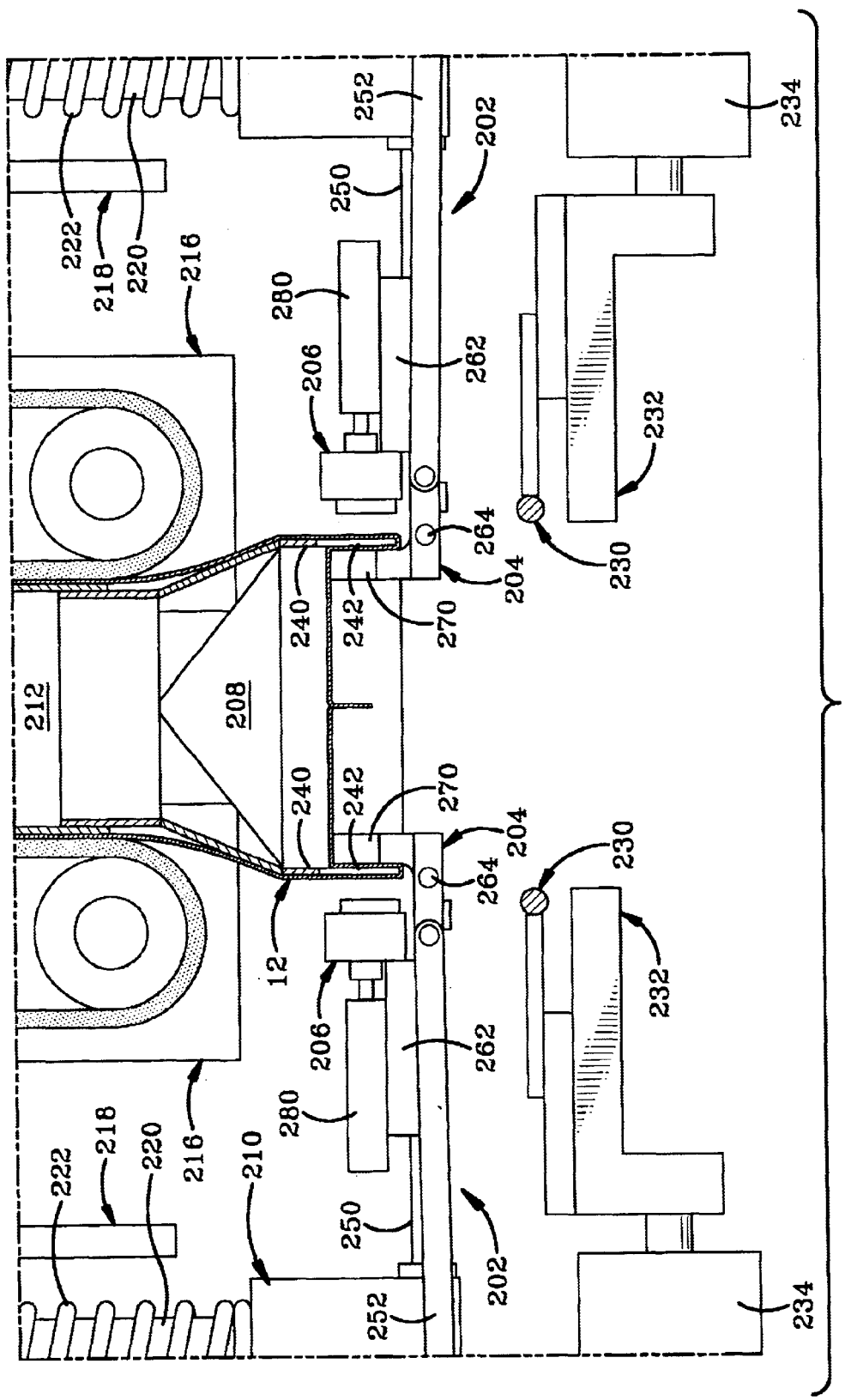
FIG. 35 is a front elevation view showing the arms in the extended position with the crimping fingers in the welding position with the lower rims of the bag material wrapped around the former.

As noted above, each arm 202 includes a crimping finger 204 and a welder 206. An actuator 250 is used to move arm 202 from its retracted position to its extended position. A link 252 is used to automatically move crimping finger 204 from its resting position (FIG. 29) to its welding position (FIG. 35). In other embodiments of the invention, an actuator may be used to pivot finger 204. Link 252 includes an outer end 254 having a slot 256. A stop 258 is disposed in slot 256. Slot 256 allows arm 202 to move inwardly before link 252 starts pivoting crimping finger 204. The inner end 260 of link 252 is pivotally connected to crimping finger 204.

Figure 27:
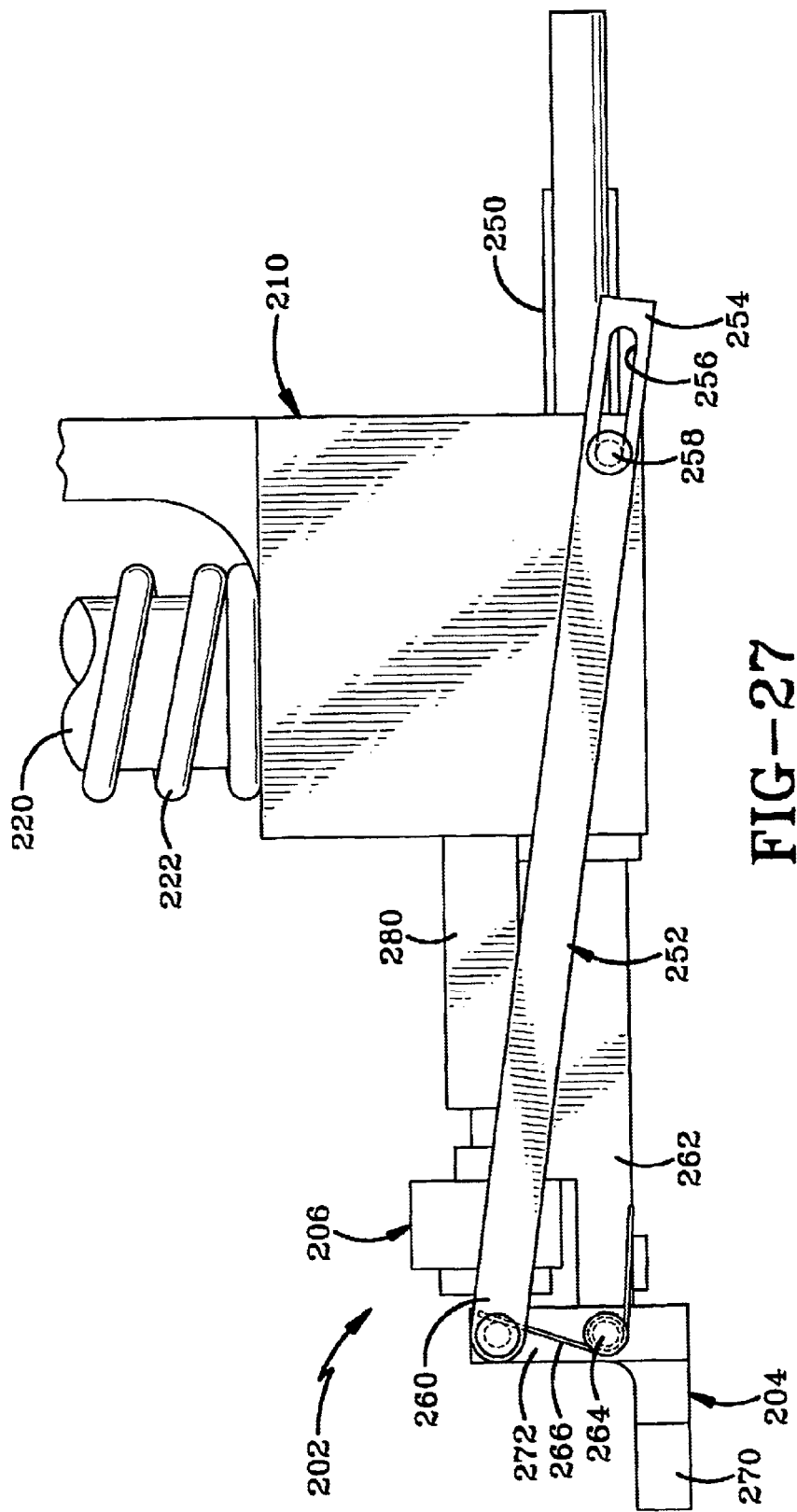
FIG. 27 is a front elevation view of one of the arm assemblies of the apparatus.
Figure 28:
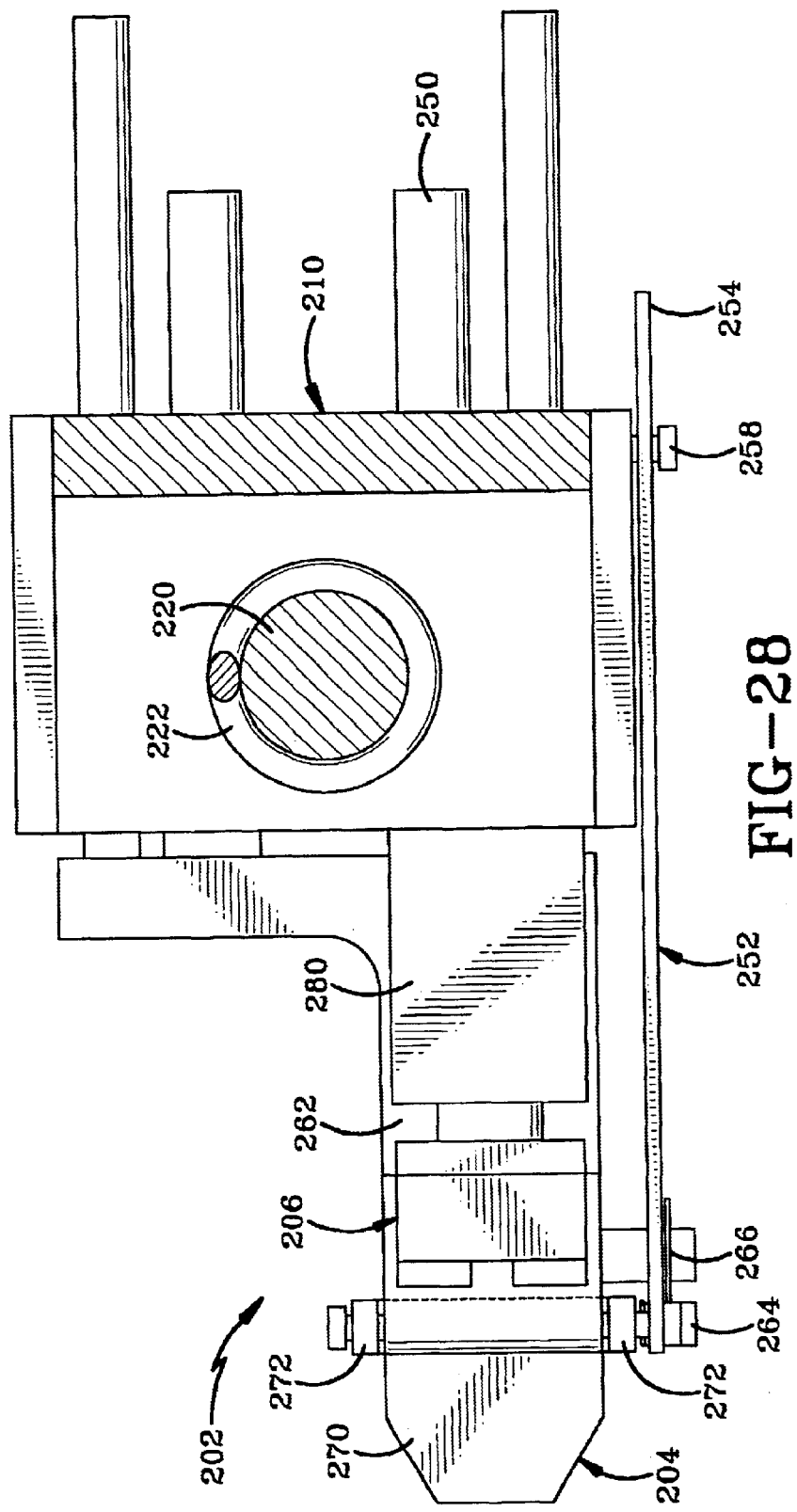
FIG. 28 is a top plan view of FIG. 27.
Figure 33:
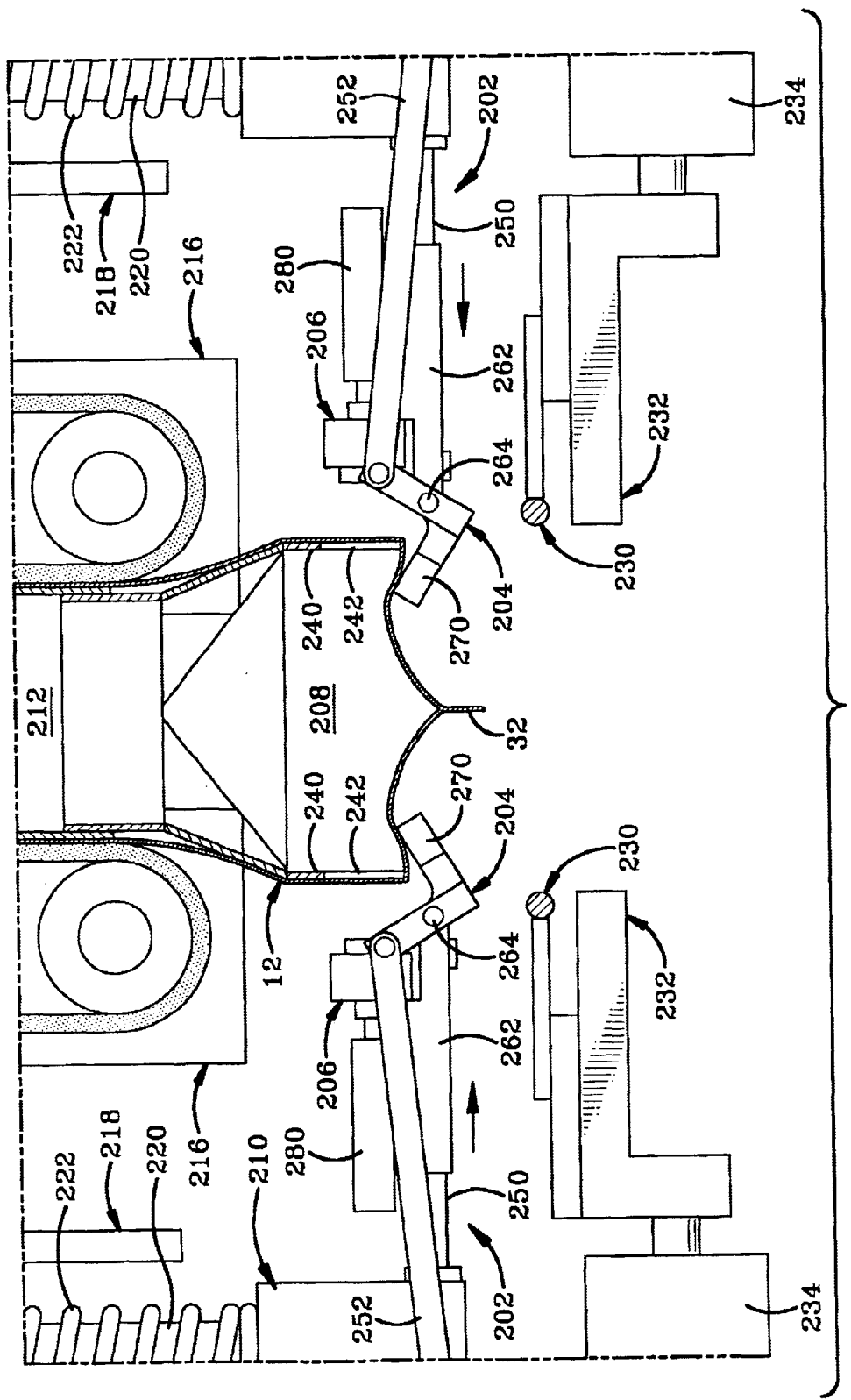
FIG. 33 is a front elevation view showing the arms moving from the retracted position toward the extended position with the link starting to pivot the crimping fingers to indent the bottom of the bag.
Figure 34:
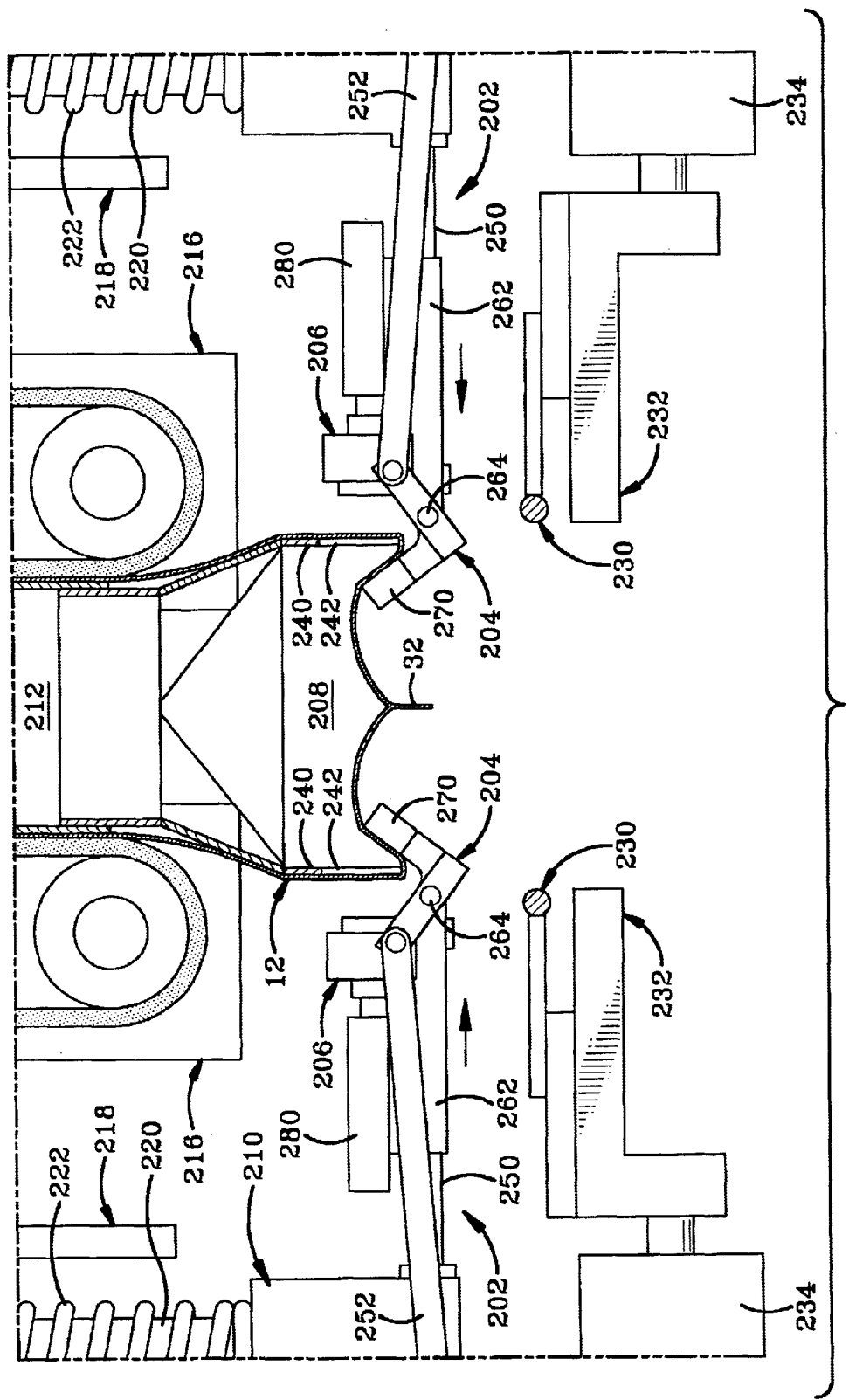
FIG. 34 is a front elevation view showing the arms moving from the retracted position toward the extended position with the link pivoting the crimping fingers to indent the bottom of the bag.
Figure 36:
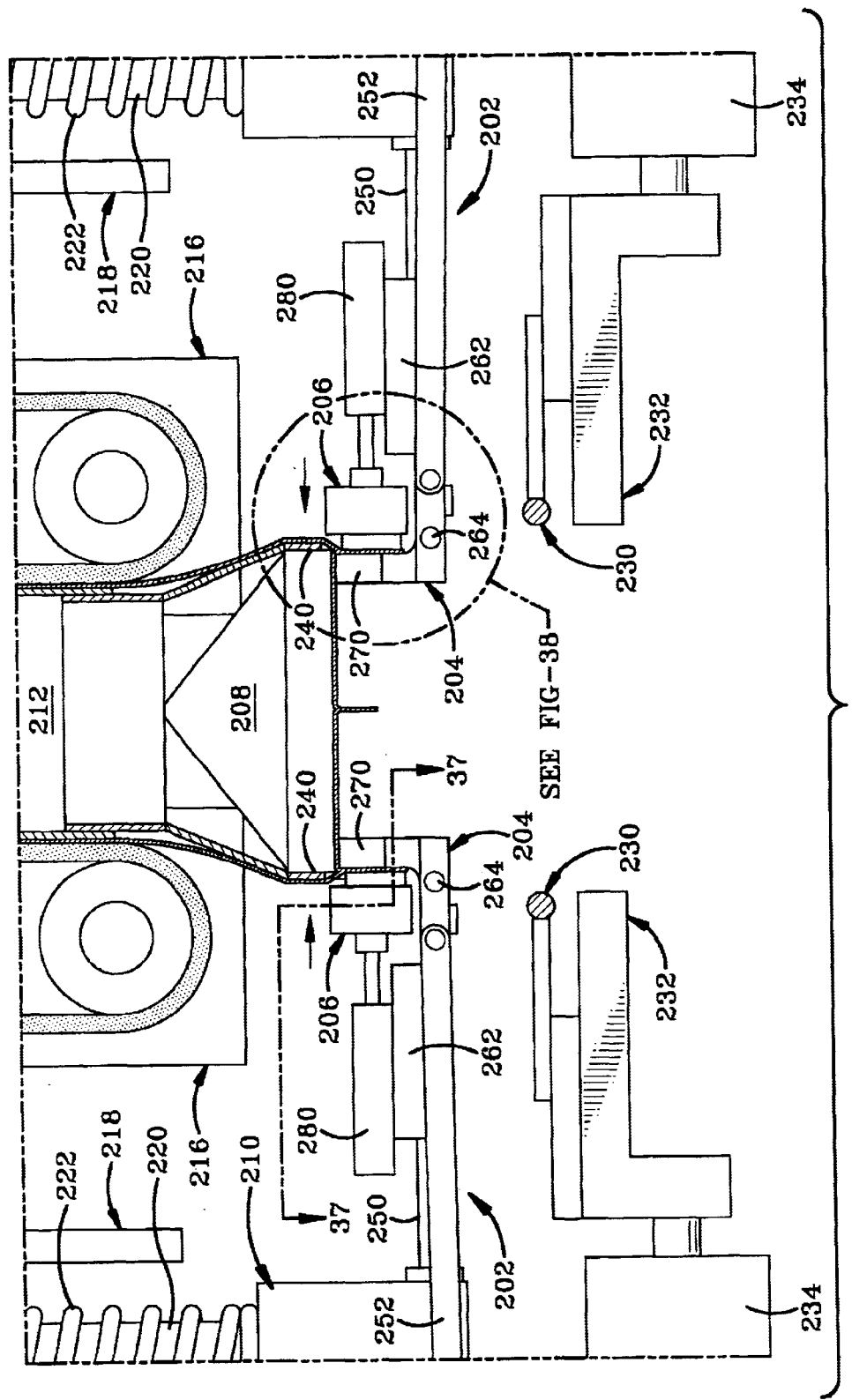
FIG. 36 is a front elevation view showing the welders moved to a welding position.
Figure 37:
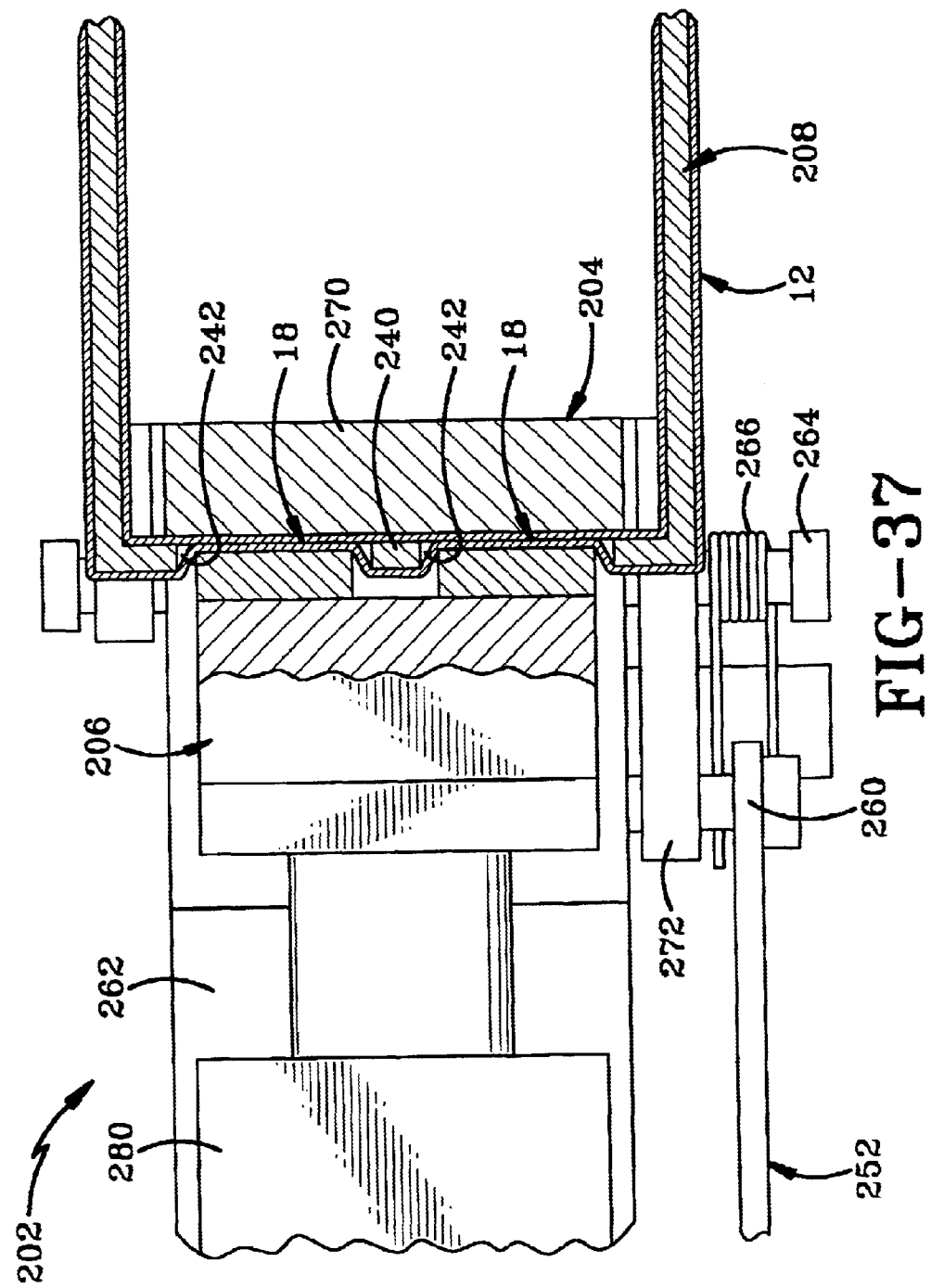
FIG. 37 is a section view taken along line 37—37 of FIG. 36.
Figure 38:
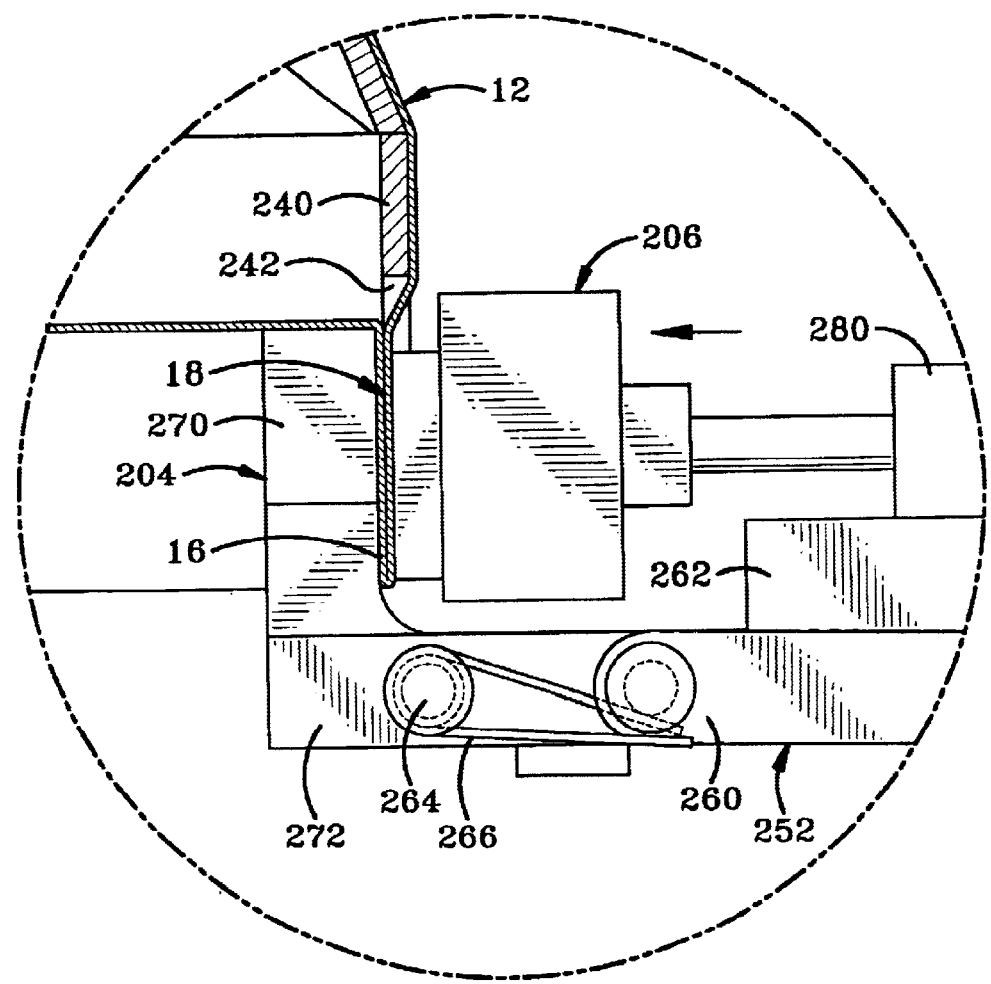
FIG. 38 is an enlarged view of the encircled portion of FIG. 36.

Crimping finger 204 is pivotally connected to the inner end of the base 262 of arm 202 with a pivot pin 264. A spring 266 biases finger 204 from the welding position toward the resting position as shown in FIG. 27. Finger 204 is in the form of an "L" with a weld portion 270 and a base portion 272. Weld portion 270 is adapted to crimp tube 12 up into former 208 as shown in FIGS. 33–35 and act as a backing for welder 206 as shown in FIGS. 36–38. Base portion 272 has an outer end that is pivotally connected to end 260 of link 252. The inner end of base portion 272 connects to weld portion 270. The pivot location between finger 204 and base 262 is disposed intermediate the inner and outer ends to create the desired in and up movement of weld portion 270 that allows weld portion 270 to pivot around former 208.

Each welder 206 has its own actuator 280 that extends and retracts welder 206. If desirable, a link system and spring may also be used to move welder 206.

The method of this embodiment of the invention includes the steps of providing tube 12 of bag material about former 208 and sealing the end of tube 12 to form bottom seal 32. Crimping fingers 204 then move a portion of tube 12 upwardly about former 208 where these portions are welded to form welds 18 and rim 16. In this embodiment, the crimping finger are moved in from the sides of tube 12 and pivot to move the portion of tube 12 upwardly with respect to former 208. This method may be performed by a variety of different apparatus with apparatus 201 being an exemplary embodiment.

Figure 31:
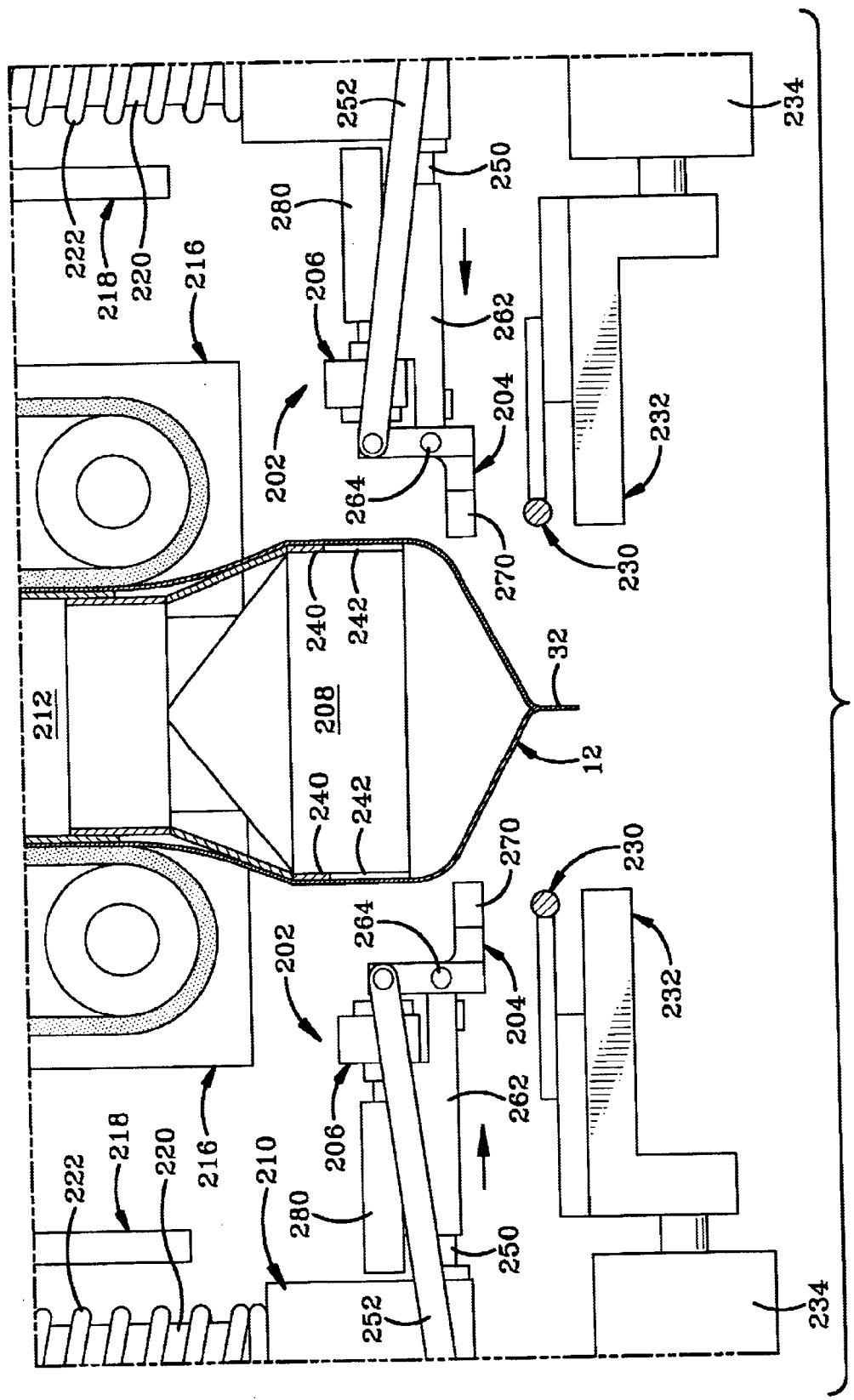
FIG. 31 is a front elevation view showing the arms initially moving from the retracted position toward the extended position before the outer end of the link engages the stop.
Figure 32:
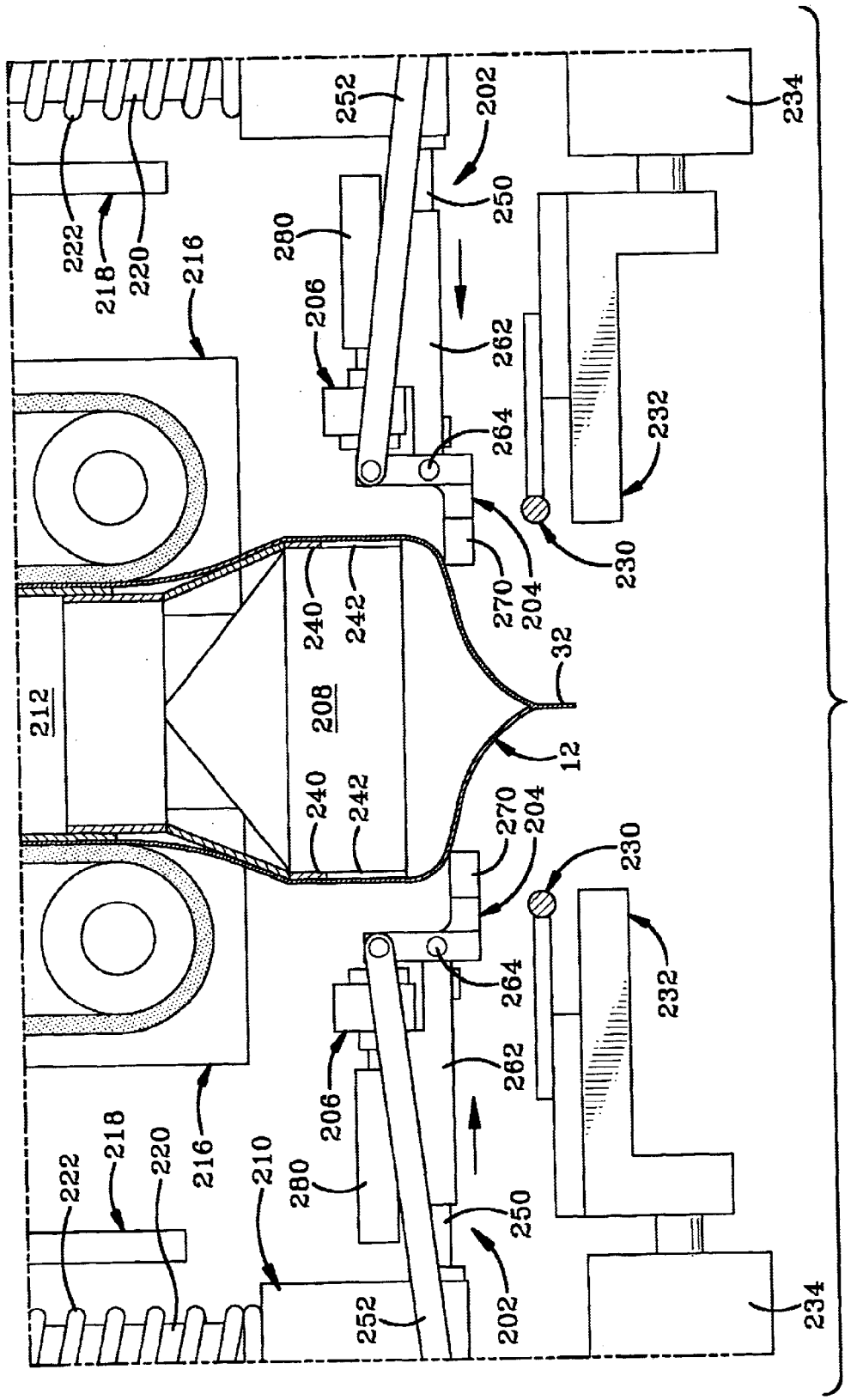
FIG. 32 is a front elevation view showing the arms moving from the retracted position toward the extended position just as the outer end of the link engages the stop.

FIG. 29 shows a complete bag 10 at the bottom of the page with its top seal 30 being formed and being cut away from tube 12. Elements 230 and 232 then retract so that the next bag 10 may be formed. In FIG. 30, former 208 is moved up to the welding position with sealers 230/232 fully retracted. Arms 202 then move inwardly to form the bottom of bag 10. In FIG. 31, arms 202 are initially moving from the retracted position toward the extended position before outer end 254 of link 252 engages stop 258. FIG. 32 shows arms 202 engaing tube 12 just as outer end 254 of link 252 engages stop 258. FIGS. 33 and 34 shows link 252 pivoting crimping fingers 204 up and in to indent the bottom of bag 10 about former 208.

FIG. 35 shows the welding position of fingers 204 where tube 12 is fully folded about former 208 and welds 18 are ready to be formed through openings 242. Welders 206 are then moved to the welding position shown in FIGS. 36–38 to weld the material of tube 12 into welds 18. Welders 206 and arms 202 are then retracted and tube 12 is advanced. Tube 12 may then be filled and sealed. The process is then repeated to form additional bags 10.

Figure 39:
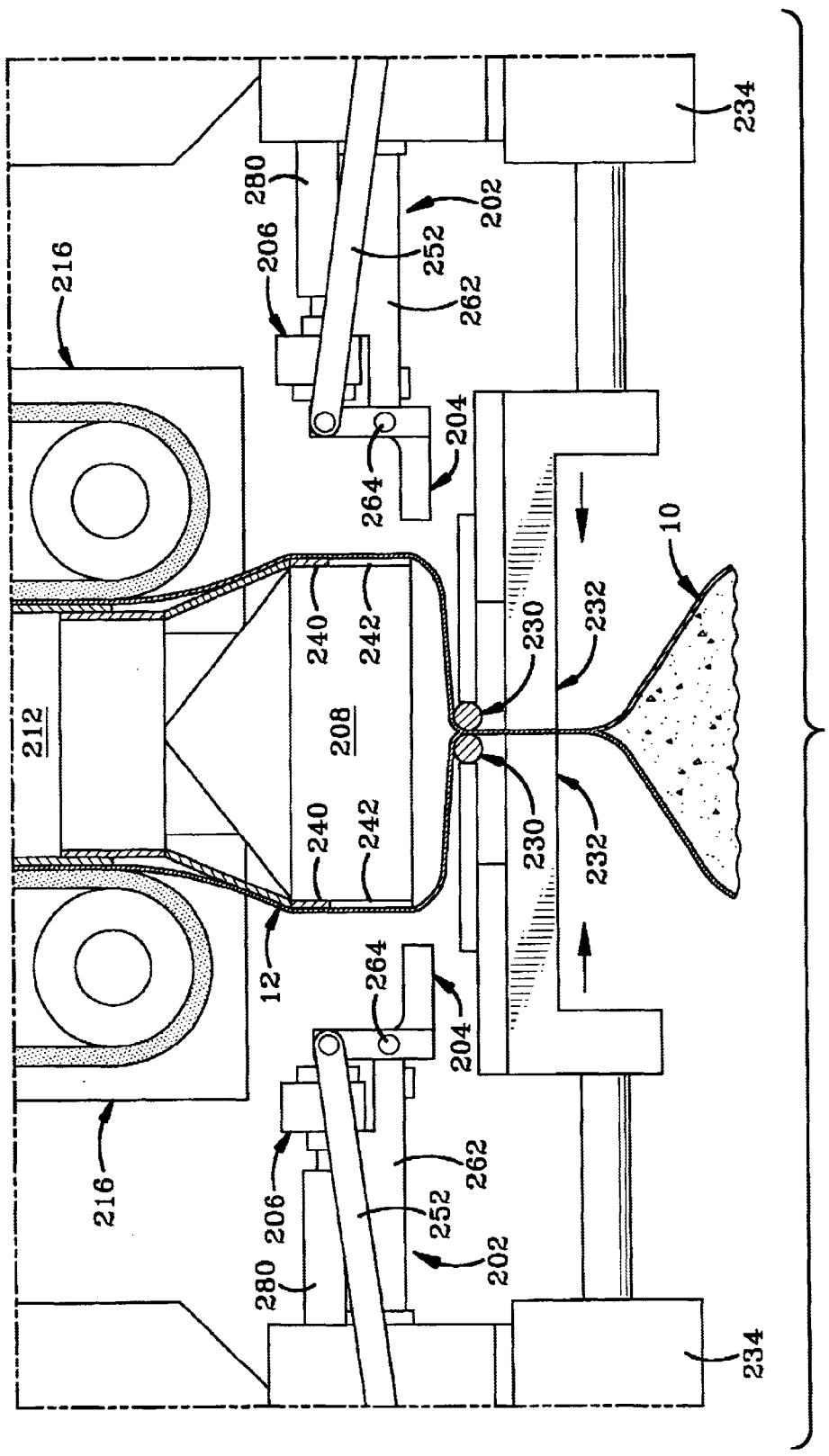
FIG. 39 is a front elevation view of another alternative apparatus sealing the top of one bag and the bottom of the next successive bag.
Figure 40:
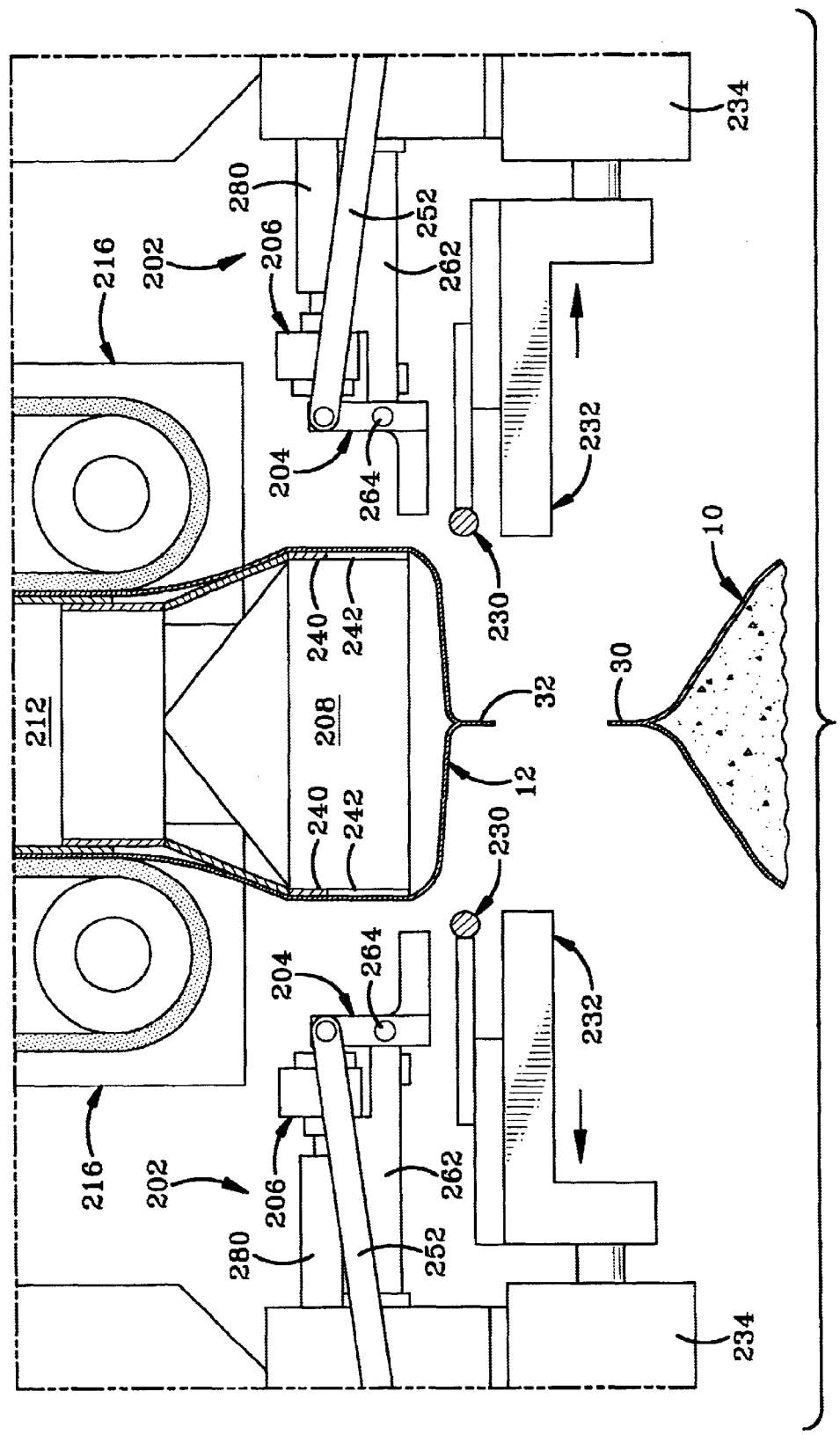
FIG. 40 is a front elevation view of the apparatus with the sealers and cutter moved to the inactivated position.
Figure 41:
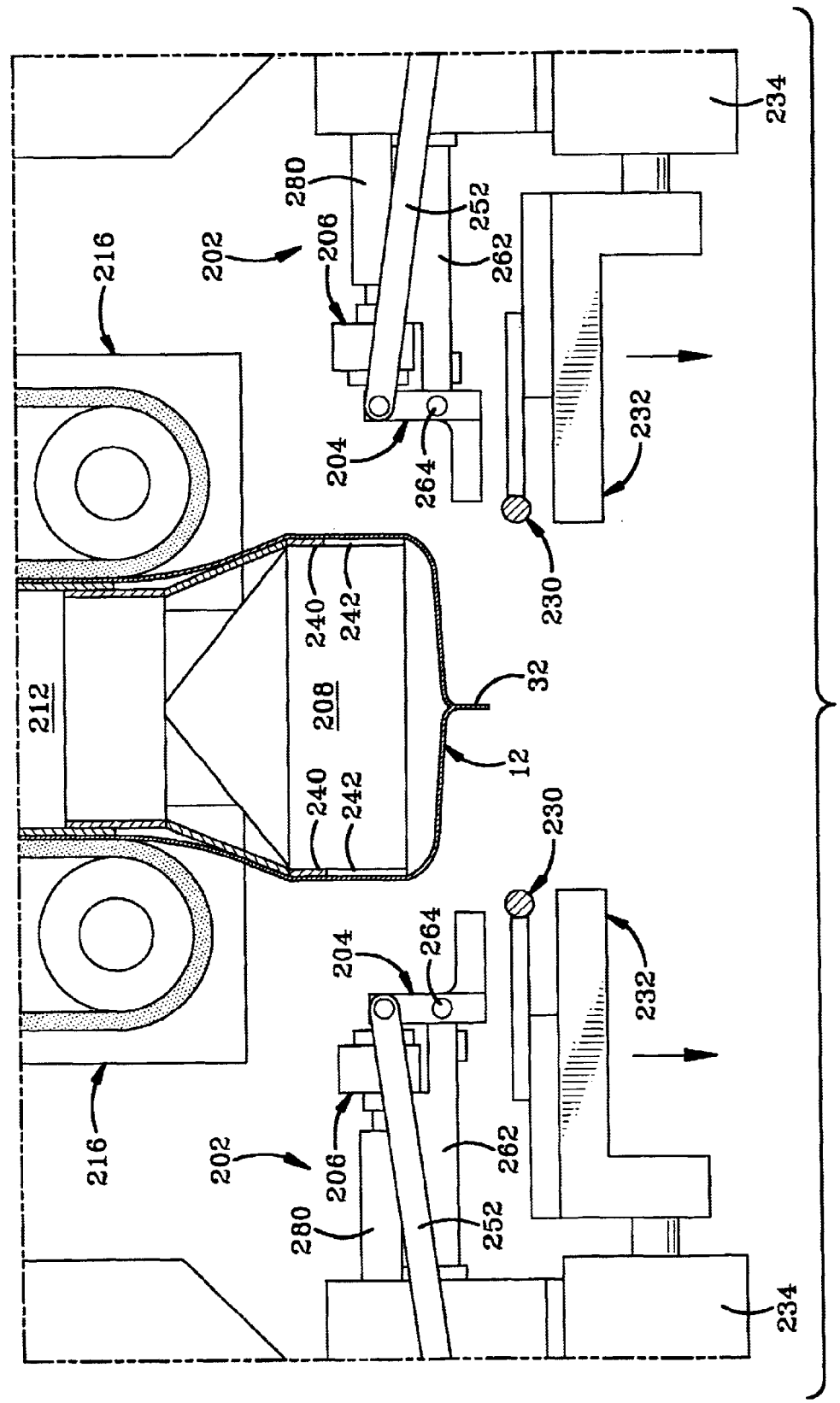
FIG. 41 shows the arms and sealers moving down with respect to a fixed former.
Figure 42:
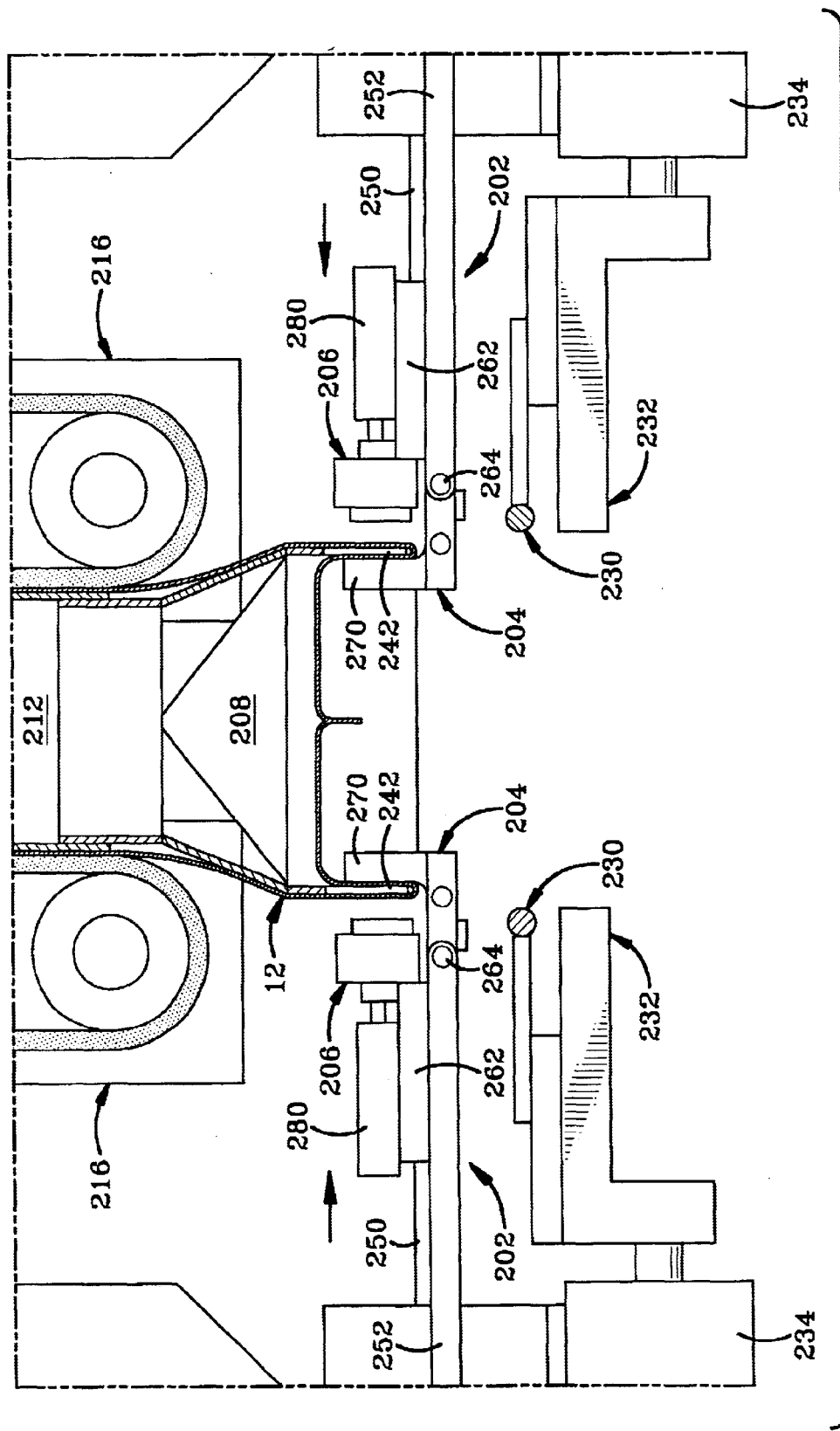
FIG. 42 shows the arms extended with the crimping finger folding the material around the former.
Figure 43:
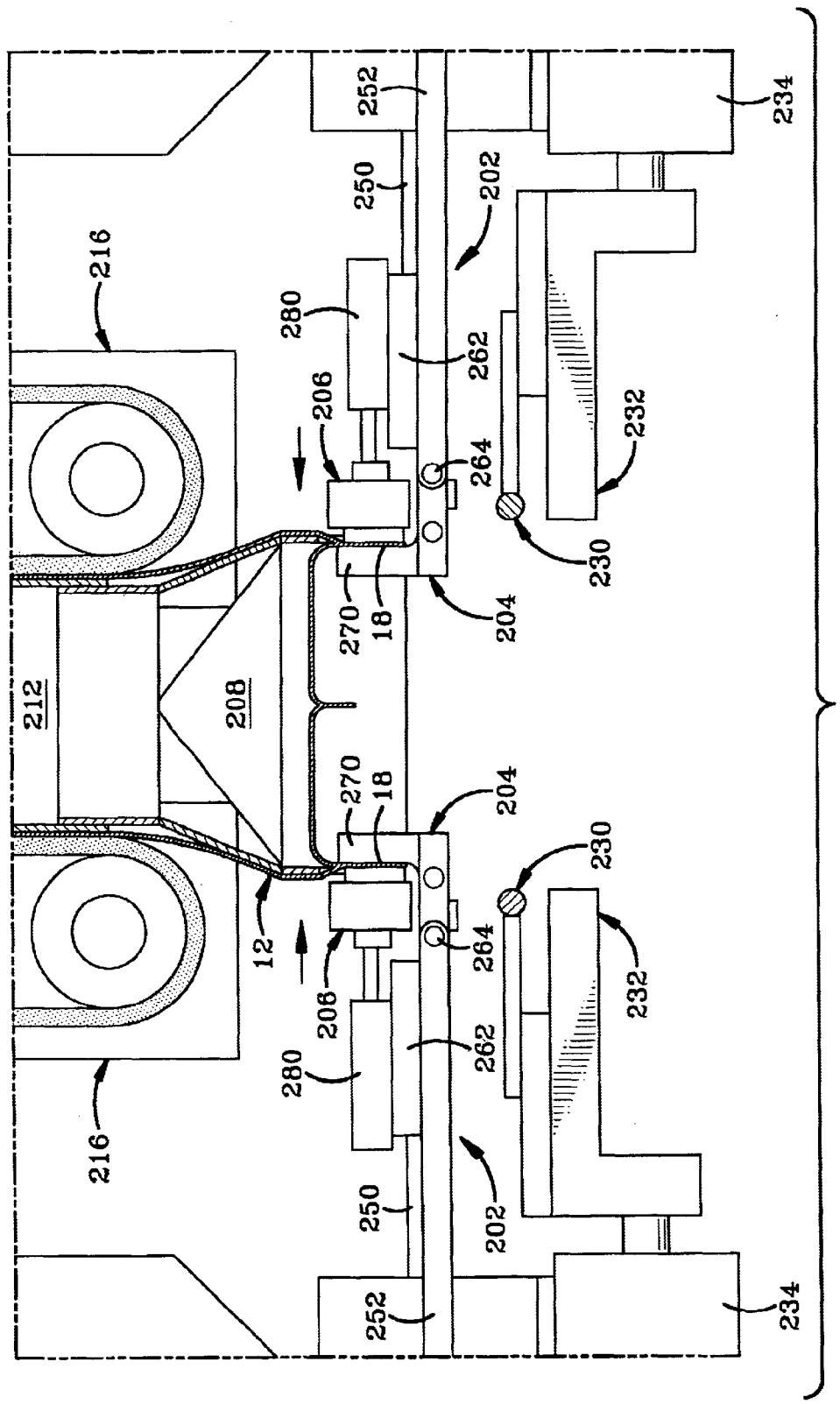
FIG. 43 shows the welders moving in to form the welds on the rim.

FIGS. 39–43 show an alternative embodiment of the invention wherein elements 230, 232 and arms 202 move down with respect to a fixed former 208. The sealing step is depicted in FIG. 39. The sealer and cutter 230/232 then move out. The assembly then moves down out of the way for arms 202 to come in from the sides of former 208 as shown in FIGS. 41–43. This embodiment has the advantage that former 208 may be fixed in place.

Figure 44:
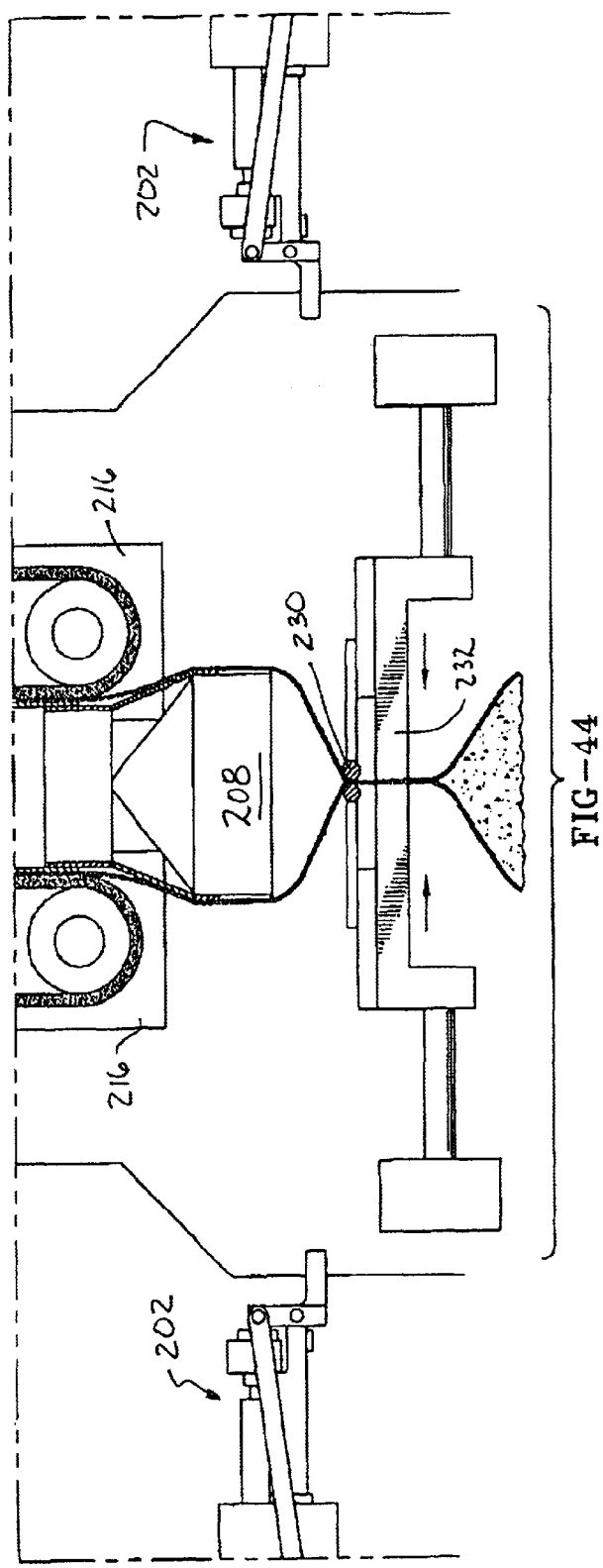
FIG. 44 is a front elevation view of a further alternative apparatus sealing the top of one bag and the bottom of the next successive bag.
Figure 45:
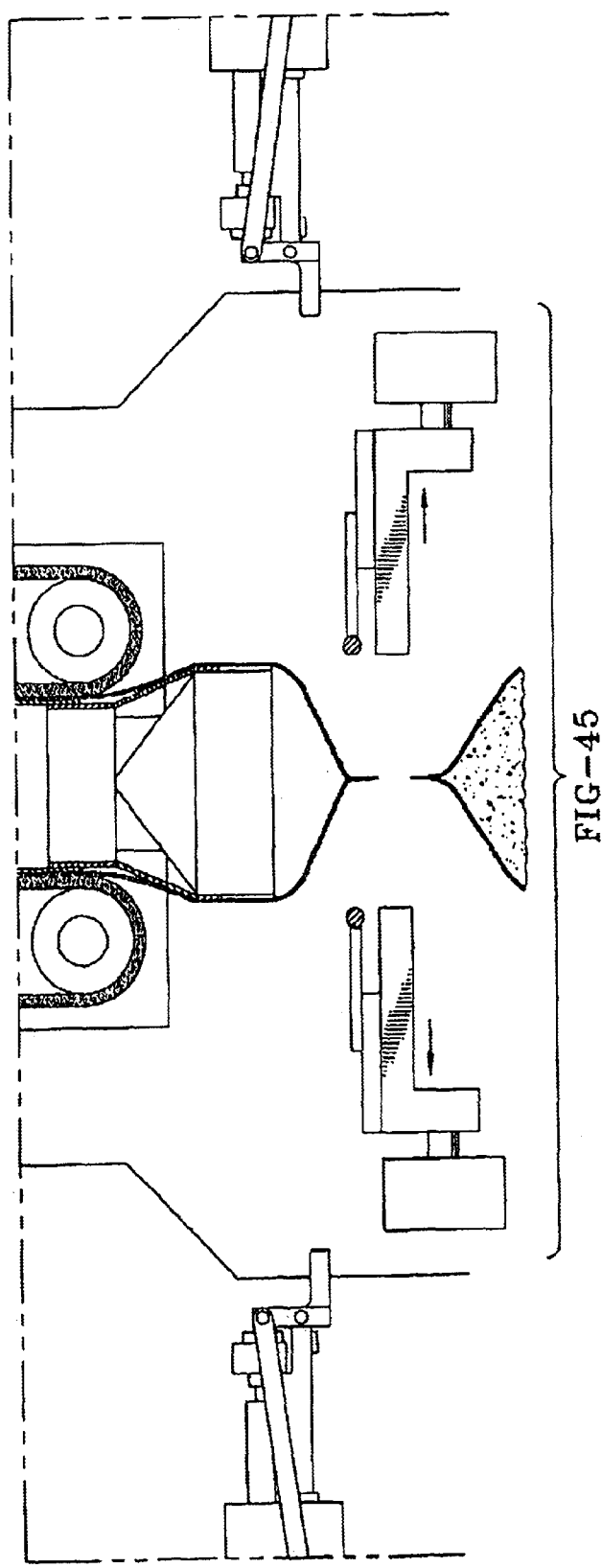
FIG. 45 shows the sealer and cutter moving back to the retracted position.
Figure 46:
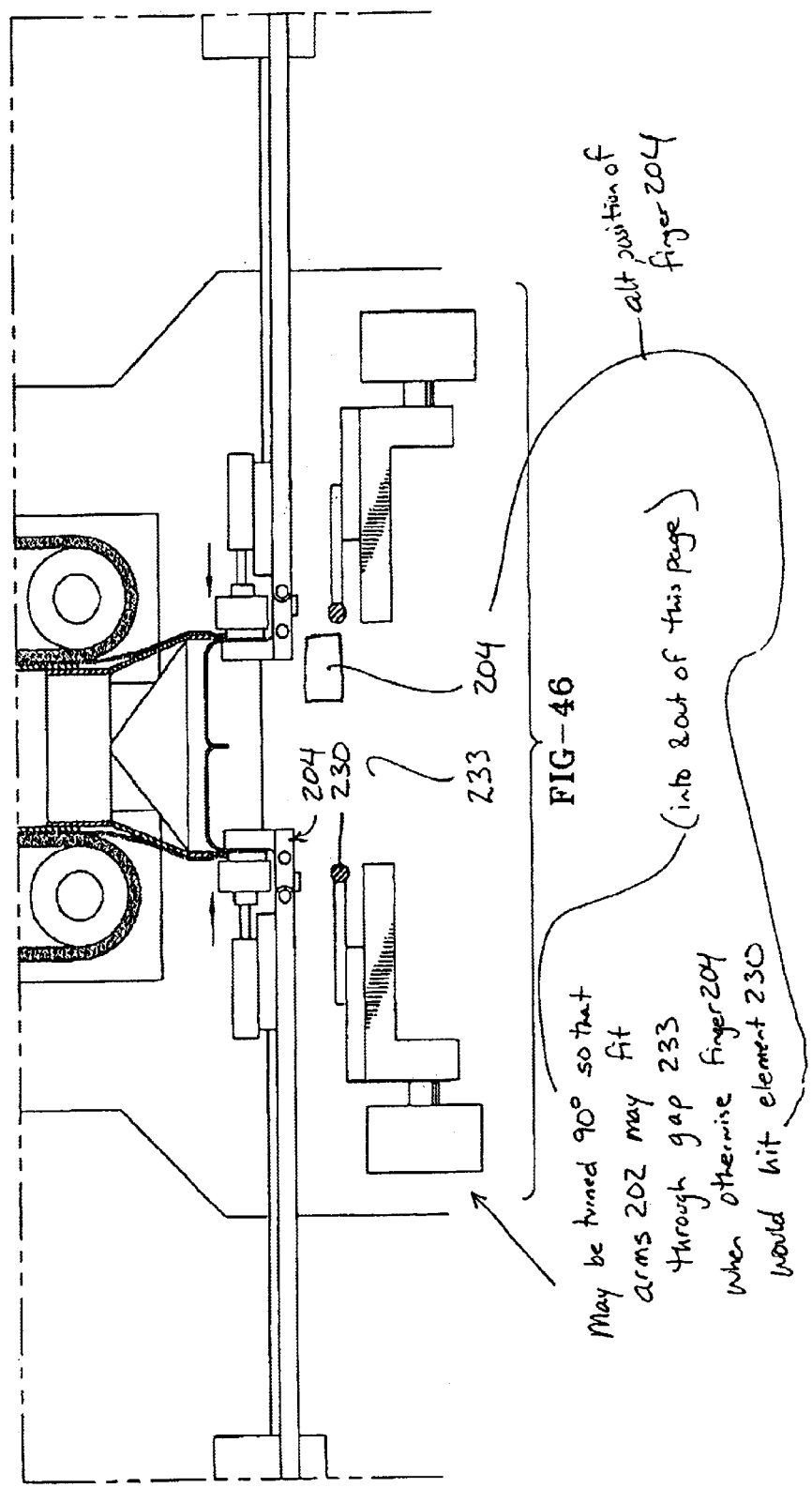
FIG. 46 shows the arms and crimping fingers in the extended position.

FIGS. 44–46 show a further alternative embodiment wherein the relative heights of the elements are fixed. Elements 230 and 232 may move in the direction shown in FIGS. 44–46 or may be turned 90 degrees so that the gap 233 formed when elements 230/232 open may be used to provide room for arms 202. In the turned 90 degrees embodiment, element 204 would be placed at the same height as element 230 such that they would hit each other if extended at the same time. Gap 233 allows arms 202 to slide into position when gap is formed. This embodiment allows bags 10 to be formed without vertical movement of former 208 or welder/sealers 230/232.

In all of these embodiments, arms 202 may be provided in different numbers than the two opposed arms shown in the drawings. In addition, former 208 may have other shaped such as round, oval, triangular, square, rectangular, etc. With each of these formers 208, any of a variety of weld openings may be used.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A method of forming a bag comprising the steps of:
    (a) providing a tube of material that will be used to form the body of the bag;
    (b) positioning the tube of material about a former;
    (c) closing a portion of the tube to form the bottom closure seam of the bag;
    (d) folding a portion of the closed tube around a portion of the former to define a rim and a bottom wall by pivoting crimping fingers into the closed portion of the tube;
    (e) welding at least one portion of the rim and, (f) filling the tube with material after step (d).

2. The method of claim 1, wherein step (e) includes the step of welding a plurality of spaced locations about the rim.

3. The method of claim 1, wherein the crimping fingers are mounted on arms and further comprising the step of moving the arms inwardly with respect to the tube of material.

4. The method of claim 3, further comprising the step of moving the arms inwardly until the crimping fingers initially engage the tube of material before the crimping fingers are pivoted.

5. The method of claim 1, further comprising the step of moving the former up with respect to the tube of material after step (c) and before step (d).

6. The method of claim 1, further comprising the step of moving the crimping fingers down with respect to the tube after step (c) and before step (d).

7. A method of forming a bag comprising the steps of:
    (a) providing a tube of material that will be used to form the body of the bag;
    (b) positioning the tube of material about a former that defines a weld opening;
    (c) closing a portion of the tube below the former to form the bottom closure seam of the bag;
    (d) moving the former up with respect to the tube of material after step (c);

(e) providing at least one crimping and welding arm that moves transverse to the longitudinal direction of the tube;

(f) moving the crimping and welding arm inwardly with respect to the tube while folding a portion of the closed tube around a portion of the former to define a rim and a bottom wall;

(g) trapping a portion of the rim between first and second portions of the crimping and welding arm at the location where the former defines the at least one weld opening; and (h) welding the portion of the rim positioned at the at least one weld opening of the former.

8. The method of claim 7, further comprising the step of providing at least two crimping and welding arms that moves transverse to the longitudinal direction of the tube; the arms moving toward each other on opposite sides of the tube.

9. The method of claim 8, further comprising the step of providing at least four crimping and welding arms that moves transverse to the longitudinal direction of the tube.

10. The method of claim 7, further comprising the step of using the transversely moving crimping and welding arm to indent and form the bottom wall and rim of the bag.

11. A method of forming a bag comprising the steps of:

(a) providing, a tube of material that will be used to form the body of the bag; the tube having a longitudinal direction;

(b) positioning the tube of material about a former;

(c) closing a portion of the tube to form the bottom closure seam of the bag that is being formed;

(d) moving crimping fingers inwardly in a direction transverse to the longitudinal direction of the tube until the crimping fingers initially engage the tube of material;

(e) folding a portion of the closed tube around a portion of the former to define a rim and a bottom wall by pivoting crimping fingers into the closed portion of the tube;

(f) welding at least one portion of the rim and, (g) filling the tube with material after step (e).

12. The method of claim 11, further comprising the step of engaging the crimping fingers with the tube of material before the crimping fingers are pivoted.

13. The method of claim 11, further comprising the step of moving the former up with respect to the tube of material after step (c) and before step (e).

14. The method of claim 11, further comprising the step of moving the crimping fingers down with respect to the tube after step (c) and before step (e).

15. The method of claim 11, further comprising the step of moving a welder with each of the crimping fingers in step (d).

16. The method of claim 15, further comprising the step of using a portion of each of the crimping fingers to weld the rim in step (f).

17. A method of forming a bag comprising the steps of:

(a) providing a tube of material that will be used to form the body of the bag;

(b) positioning the tube of material about a former that defines at least one weld opening;

(c) closing portion of the tube below the former;

(d) providing at least one crimping end welding arm that moves non-parallel to the longitudinal direction of the tube;

(e) moving the crimping and welding arm inwardly with respect to the tube;

(f) engaging the crimping and welding arm with the tube while the crimping end welding arm is moving inwardly with respect to the tube;

(g) folding a portion of the closed tube around a portion of the former with the crimping and welding arm to define a rim and a bottom wall;

(h) trapping a portion of the rim between different portions of the crimping and welding arm at the location where the former defines the at least one weld opening;

(i) welding the portion of the rim positioned at the at least one weld opening of the former and, (j) filling the tube with material after step (c).

18. The method of claim 17, wherein the at least one crimping and welding arm includes a crimping finger that is pivotably connected to the crimping and welding arm; the method further comprising the step of pivoting the crimping finger during step (g).

* * * * *